US012643317B2

(12) United States Patent
Yoon et al.

(10) Patent No.: US 12,643,317 B2
(45) Date of Patent: Jun. 2, 2026

(54) ASSEMBLY MANUFACTURING EQUIPMENT AND METHOD FOR ELECTRODE ASSEMBLY

(71) Applicant: LG Energy Solution, Ltd., Seoul (KR)

(72) Inventors: Se Hyun Yoon, Daejeon (KR); Beomsu Kim, Daejeon (KR); Yong Nam Kim, Daejeon (KR); Heeyong Kim, Daejeon (KR); Dong Hyeuk Park, Daejeon (KR); Dong Myung Kim, Daejeon (KR); Jae Han Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 495 days.

(21) Appl. No.: 17/860,556

(22) Filed: Jul. 8, 2022

(65) Prior Publication Data

US 2023/0016993 A1    Jan. 19, 2023

(30) Foreign Application Priority Data

Jul. 9, 2021    (KR) ........................ 10-2021-0090588
Jul. 9, 2021    (KR) ........................ 10-2021-0090589
(Continued)

(51) Int. Cl.
*B32B 37/00*        (2006.01)
*B30B 15/06*        (2006.01)
(Continued)

(52) U.S. Cl.
CPC ............ *B32B 37/0084* (2013.01); *B32B 7/08* (2013.01); *B32B 37/0076* (2013.01);
(Continued)

(58) Field of Classification Search
CPC .... H01M 50/46; H01M 4/043; H01M 4/0471; H01M 10/0404; H01M 10/0431;
(Continued)

(56) References Cited

U.S. PATENT DOCUMENTS 9,209,491 B2    12/2015    Kim et al.
9,431,679 B2    8/2016    Kwon et al.
(Continued)

FOREIGN PATENT DOCUMENTS

CN        002763997 Y    3/2006
CN        104303355 B    3/2016
(Continued)

OTHER PUBLICATIONS

KR-2020023853-A Machine Translation.*
(Continued)

*Primary Examiner* — Miriam Stagg
*Assistant Examiner* — Quintin D. Elliott
(74) *Attorney, Agent, or Firm* — Lerner David LLP

(57)        ABSTRACT

An electrode assembly manufacturing apparatus for fabricating a stack includes a stack table, gripper, and first press unit. The stack includes a first electrode, a second electrode, and a section of a separator between the first and the second electrodes. The stack table is configured for supporting the stack. The gripper is configured for fixing the stack. The first press unit is configured for heating and compressing the stack fixed by the gripper.

14 Claims, 6 Drawing Sheets

(30) Foreign Application Priority Data

| | | |
|---|---|---|
| Jul. 9, 2021 | (KR) | 10-2021-0090590 |
| Jul. 9, 2021 | (KR) | 10-2021-0090591 |
| Jul. 9, 2021 | (KR) | 10-2021-0090592 |
| Jul. 9, 2021 | (KR) | 10-2021-0090596 |
| Jul. 9, 2021 | (KR) | 10-2021-0090597 |
| Jul. 9, 2021 | (KR) | 10-2021-0090598 |
| Jul. 9, 2021 | (KR) | 10-2021-0090600 |
| Jul. 9, 2021 | (KR) | 10-2021-0090601 |

(51) Int. Cl.
*B32B 7/08* (2019.01)
*H01M 4/04* (2006.01)
*H01M 10/04* (2006.01)

(52) U.S. Cl.
CPC ....... *H01M 10/0404* (2013.01); *B30B 15/064* (2013.01); *H01M 4/043* (2013.01)

(58) Field of Classification Search
CPC .......... H01M 10/045; H01M 10/0459; H01M 10/0468; H01M 10/0525; H01M 10/0583; H01M 50/463; H01M 50/466
See application file for complete search history.

(56) References Cited

U.S. PATENT DOCUMENTS

| | | | |
|---|---|---|---|
| 9,793,535 B2 | 10/2017 | Yu et al. | |
| 10,333,126 B2 | 6/2019 | Joo et al. | |
| 10,985,356 B2 | 4/2021 | Joo et al. | |
| 2005/0186479 A1 | 8/2005 | Totsuka et al. | |
| 2006/0019154 A1 | 1/2006 | Imachi et al. | |
| 2007/0202394 A1 | 8/2007 | Viavattine | |
| 2008/0070115 A1 | 3/2008 | Saruwatari et al. | |
| 2008/0280208 A1 | 11/2008 | Naoi et al. | |
| 2009/0029259 A1 | 1/2009 | Okazaki et al. | |
| 2009/0136844 A1 | 5/2009 | Watanabe et al. | |
| 2010/0167176 A1 | 7/2010 | Kawai | |
| 2011/0052964 A1 | 3/2011 | Kim et al. | |
| 2011/0104550 A1 | 5/2011 | Ahn et al. | |
| 2013/0306237 A1 | 11/2013 | Nagasaka et al. | |
| 2014/0050958 A1 | 2/2014 | Kwon et al. | |
| 2014/0205879 A1 | 7/2014 | Jang et al. | |
| 2015/0033527 A1 | 2/2015 | Park et al. | |
| 2015/0162638 A1 | 6/2015 | Bernini et al. | |
| 2015/0180082 A1 | 6/2015 | Jung et al. | |
| 2015/0188108 A1 | 7/2015 | Miyazawa et al. | |
| 2015/0357671 A1 | 12/2015 | Park et al. | |
| 2016/0006072 A1 | 1/2016 | Cho et al. | |
| 2016/0028064 A1 | 1/2016 | Choi et al. | |
| 2016/0036087 A1 | 2/2016 | Na et al. | |
| 2016/0285062 A1 | 9/2016 | Jo et al. | |
| 2016/0372781 A1 | 12/2016 | Kwon et al. | |
| 2016/0380301 A1 | 12/2016 | Kosaka et al. | |
| 2017/0125794 A1 | 5/2017 | Zhao et al. | |
| 2018/0076424 A1 | 3/2018 | Kato | |
| 2018/0090787 A1 | 3/2018 | Makino et al. | |
| 2018/0102568 A1 | 4/2018 | Otohata | |
| 2018/0205109 A1 | 7/2018 | Cho et al. | |
| 2018/0226623 A1 | 8/2018 | Cho et al. | |
| 2018/0233725 A1 | 8/2018 | Yasuda et al. | |
| 2018/0233752 A1 | 8/2018 | Herrmann et al. | |
| 2018/0248219 A1* | 8/2018 | Kim | H01M 10/0481 |
| 2018/0294509 A1 | 10/2018 | Liu et al. | |
| 2018/0342722 A1 | 11/2018 | Zeng et al. | |
| 2018/0351194 A1 | 12/2018 | Lee et al. | |
| 2019/0020009 A1 | 1/2019 | Watanabe et al. | |
| 2019/0044177 A1 | 2/2019 | Lee et al. | |
| 2019/0051924 A1 | 2/2019 | Kim et al. | |
| 2020/0006733 A1 | 1/2020 | Cho et al. | |
| 2020/0127334 A1 | 4/2020 | Pyo et al. | |
| 2020/0185753 A1 | 6/2020 | Kwon | |
| 2020/0227787 A1 | 7/2020 | Kang et al. | |
| 2020/0227788 A1 | 7/2020 | Chun et al. | |
| 2020/0235434 A1 | 7/2020 | Lee et al. | |
| 2020/0335813 A1 | 10/2020 | Oh et al. | |
| 2021/0050616 A1* | 2/2021 | Taguchi | H01M 50/443 |
| 2021/0104775 A1 | 4/2021 | Ono et al. | |
| 2021/0184242 A1 | 6/2021 | Lee et al. | |
| 2021/0351431 A1 | 11/2021 | Hwang | |
| 2022/0006161 A1 | 1/2022 | Kim et al. | |
| 2022/0029246 A1 | 1/2022 | Watanabe et al. | |
| 2022/0393225 A1 | 12/2022 | Kim et al. | |
| 2023/0006262 A1 | 1/2023 | Maruhashi et al. | |
| 2023/0036396 A1 | 2/2023 | Hosokawa et al. | |

FOREIGN PATENT DOCUMENTS

| | | |
|---|---|---|
| CN | 103828086 B | 3/2017 |
| CN | 108390101 A | 8/2018 |
| CN | 110050374 A | 7/2019 |
| CN | 210403945 U | 4/2020 |
| CN | 113013553 A | 6/2021 |
| EP | 2856552 B1 | 5/2016 |
| EP | 3905417 A1 | 11/2021 |
| EP | 3985778 A1 | 4/2022 |
| EP | 4027421 A1 | 7/2022 |
| JP | S45-005056 Y1 | 3/1970 |
| JP | h02046663 A | 2/1990 |
| JP | H08138722 A | 5/1996 |
| JP | 2002-208442 A | 7/2002 |
| JP | 2002367628 A | 12/2002 |
| JP | 2003-151615 A | 5/2003 |
| JP | 2003201352 A | 7/2003 |
| JP | 2005243455 A | 9/2005 |
| JP | 2006032246 A | 2/2006 |
| JP | 20080027865 A | 2/2008 |
| JP | 2008-091192 A | 4/2008 |
| JP | 2008282739 A | 11/2008 |
| JP | 2009-218105 A | 9/2009 |
| JP | 2009259719 A | 11/2009 |
| JP | 2010199281 A | 9/2010 |
| JP | 2012033275 A | 2/2012 |
| JP | 2013-149477 A | 8/2013 |
| JP | 2013-254629 A | 12/2013 |
| JP | 2015-141791 A | 8/2015 |
| JP | 2015531989 A | 11/2015 |
| JP | 2015532766 A | 11/2015 |
| JP | 2016103425 A | 6/2016 |
| JP | 2017-016946 A | 1/2017 |
| JP | 2018-018712 A | 2/2018 |
| JP | 2018-41703 A | 3/2018 |
| JP | 2018510472 A | 4/2018 |
| JP | 2018-532240 A | 11/2018 |
| JP | 2018181843 A | 11/2018 |
| JP | 20190057426 A | 4/2019 |
| JP | 2019153427 A | 9/2019 |
| JP | 2019199028 A | 11/2019 |
| JP | 2020145123 A | 9/2020 |
| JP | 6844476 B2 | 3/2021 |
| KR | 20080063523 A | 7/2008 |
| KR | 20100051353 A | 5/2010 |
| KR | 20110048132 A | 5/2011 |
| KR | 101058786 B1 | 8/2011 |
| KR | 101209010 B1 | 12/2012 |
| KR | 20130132230 A | 12/2013 |
| KR | 20140002718 A | 1/2014 |
| KR | 20140022447 A | 2/2014 |
| KR | 2014-0060797 A | 5/2014 |
| KR | 2014-0064405 A | 5/2014 |
| KR | 20140062761 A | 5/2014 |
| KR | 20150016671 A | 2/2015 |
| KR | 20150020667 A | 2/2015 |
| KR | 2015-0022264 A | 3/2015 |
| KR | 2015-0035079 A | 4/2015 |
| KR | 20150034944 A | 4/2015 |
| KR | 20150049892 A | 5/2015 |
| KR | 20150050505 A | 5/2015 |
| KR | 101531234 B1 | 6/2015 |
| KR | 20150144183 A | 12/2015 |
| KR | 101595621 B1 | 2/2016 |
| KR | 20160054219 A | 5/2016 |

(56) References Cited

FOREIGN PATENT DOCUMENTS

| | | | | | |
|---|---|---|---|---|---|
| KR | 101643593 | B1 | | 7/2016 | |
| KR | 20160108116 | A | | 9/2016 | |
| KR | 101704759 | B1 | | 2/2017 | |
| KR | 101761720 | B1 | | 7/2017 | |
| KR | 101784033 | B1 | | 10/2017 | |
| KR | 2017-0124336 | A | | 11/2017 | |
| KR | 20180006324 | A | | 1/2018 | |
| KR | 101826894 | B1 | | 2/2018 | |
| KR | 101838350 | B1 | | 3/2018 | |
| KR | 20180037847 | A | | 4/2018 | |
| KR | 20180061872 | A | | 6/2018 | |
| KR | 20180082150 | A | | 7/2018 | |
| KR | 20180128770 | A | | 12/2018 | |
| KR | 101941144 | B1 | | 1/2019 | |
| KR | 101963313 | B1 | | 3/2019 | |
| KR | 20190054491 | A | | 5/2019 | |
| KR | 20190056812 | A | | 5/2019 | |
| KR | 20190064977 | A | | 6/2019 | |
| KR | 101995038 | B1 | | 7/2019 | |
| KR | 102044363 | B1 | | 11/2019 | |
| KR | 2020023853 | A | * | 3/2020 | B32B 37/06 |
| KR | 20200023852 | A | | 3/2020 | |
| KR | 20200023853 | A | | 3/2020 | |
| KR | 20200023854 | A | | 3/2020 | |
| KR | 20200036641 | A | | 4/2020 | |
| KR | 2020061033 | A | * | 6/2020 | B32B 37/0046 |
| KR | 20200061033 | A | | 6/2020 | |
| KR | 20200067575 | A | | 6/2020 | |
| KR | 20200069171 | A | | 6/2020 | |
| KR | 20200094325 | A | | 8/2020 | |
| KR | 20200095896 | A | | 8/2020 | |
| KR | 102164576 | B1 | * | 10/2020 | |
| KR | 20200145375 | A | | 12/2020 | |
| KR | 20210033327 | A | | 3/2021 | |
| KR | 102253132 | B1 | | 5/2021 | |
| KR | 20210049297 | A | | 5/2021 | |
| KR | 20210051155 | A | | 5/2021 | |
| KR | 20210051164 | A | | 5/2021 | |
| KR | 2021-0074026 | A | | 6/2021 | |
| KR | 102256438 | B1 | | 6/2021 | |
| KR | 102265741 | B1 | | 6/2021 | |
| KR | 20210135861 | A | | 11/2021 | |
| WO | 2006120959 | A1 | | 11/2006 | |
| WO | 2016-152922 | A1 | | 9/2016 | |
| WO | 2017018456 | A1 | | 2/2017 | |
| WO | 2017/149991 | A1 | | 9/2017 | |
| WO | 2018116295 | A1 | | 6/2018 | |
| WO | 2019188719 | A1 | | 10/2019 | |
| WO | 2021/131879 | A1 | | 7/2021 | |

OTHER PUBLICATIONS

KR-102164576-B1 Machine Translation.*
KR-2020061033-A Machine Translation.*
Extended European Search Report for Application No. 22838066.3 dated Aug. 5, 2024, pp. 1-5.
International Search Report for Application No. PCT/KR2022/010005 mailed Nov. 8, 2022, pp. 1-3.
International Search Report for Application No. PCT/KR2022/010009 mailed Nov. 4, 2022, pp. 1-3.
International Search Report for Application No. PCT/KR2022/010001 mailed Nov. 8, 2022, pp. 1-3.
International Search Report for Application No. PCT/KR2022/010008 mailed Nov. 4, 2022, pp. 1-3.
International Search Report for Application No. PCT/KR2022/010007 mailed Oct. 28, 2022, pp. 1-3.
Extended European Search Report including Written Opinion for Application No. 22838071.3 dated Jun. 24, 2024, pp. 1-8.
Notice of Preliminary Rejection for Korean Application No. 10-2022-0084662 dated Jan. 1, 2023. 8 pgs.
International Search Report for Application No. PCT/KR2022/010010 mailed Oct. 28, 2022, pp. 1-3.
International Search Report for Application No. PCT/KR2022/010006 mailed Nov. 4, 2022, pp. 1-3.
Written Opinion of the ISA for PCT/KR2022/010004 mailed Oct. 26, 2022. 4 pgs.
Written Opinion of the ISA for PCT/KR2022/010003 mailed Nov. 2, 2022. 3 pgs.
Written Opinion of the ISA for PCT/KR2022/010000 mailed Oct. 26, 2022. 4 pgs.
Third Party Observation for European Application No. 22838072.1 dated May 13, 2025. 11 pgs.

* cited by examiner

ASSEMBLY MANUFACTURING EQUIPMENT AND METHOD FOR ELECTRODE ASSEMBLY

CROSS-REFERENCE TO RELATED APPLICATIONS

This application claims priority from Korean Patent Application No. 10-2021-0090592 filed on Jul. 9, 2021, Korean Patent Application No. 10-2021-0090590 filed on Jul. 9, 2021, Korean Patent Application No. 10-2021-0090596 filed on Jul. 9, 2021, Korean Patent Application No. 10-2021-0090588 filed on Jul. 9, 2021, Korean Patent Application No. 10-2021-0090589 filed on Jul. 9, 2021, Korean Patent Application No. 10-2021-0090591 filed on Jul. 9, 2021, Korean Patent Application No. 10-2021-0090597 filed on Jul. 9, 2021, Korean Patent Application No. 10-2021-0090598 filed on Jul. 9, 2021, Korean Patent Application No. 10-2021-0090600 filed on Jul. 9, 2021, and Korean Patent Application No. 10-2021-0090601 filed on Jul. 9, 2021, the entire contents of all of which are incorporated herein by reference.

TECHNICAL FIELD

The present disclosure relates to an electrode assembly manufacturing apparatus and method. More particularly, the present disclosure relates to an electrode assembly manufacturing apparatus and method for fixing an electrode and separator stack for an electrode assembly to prevent distortion during compression of the stack.

BACKGROUND

Secondary batteries, unlike primary batteries, are rechargeable and have been widely researched and developed in recent years due to their small size and large capacity. As technology development and demand for mobile devices increase, the demand for secondary batteries as an energy source is rapidly increasing.

The secondary battery is classified into a coin-type battery, a cylindrical battery, a prismatic battery, and a pouch-type battery according to a shape of a battery case. In a secondary battery, an electrode assembly mounted inside a battery case is a chargeable/dischargeable power generating element having a stacked structure of an electrode and a separator.

The electrode assembly may be generally classified into a jelly-roll type in which a separator is interposed between a positive electrode and a negative electrode of a sheet type coated with an active material and wound, a stack type in which pluralities of positive and negative electrodes are sequentially stacked with a separator interposed therebetween, and a stack-and-folding type in which stacked unit cells are wound with a long-length separation film.

In a process of manufacturing a stack-and-folding type electrode assembly in the related art, an electrode assembly was manufactured by heating and compressing a stack in which an electrode and a separator are stacked to bond the electrode and the separator. However, in the electrode assembly manufacturing process in the related art, the electrode is known to become distorted when the stack is compressed.

To address this issue, the electrode and the separator are stacked by heating the separator, and the respective layers of the stack are stacked and bonded to each other at the same time by stacking and compressing each of the respective layers as they are added to the electrode.

However, these benefits diminish for later stacked electrodes. The adhesive force of the first stacked electrode increases through a plurality of pressing processes, but the adhesive force relatively lower for later stacked electrodes and the least for the last stacked electrode due to the last stacked electrode being subjected to only one pressing process.

That is, the adhesive force decreases in the stacking direction. Thus, there is a need to provide greater uniformity in the adhesive forces throughout the stack of the electrode assembly.

SUMMARY OF THE DISCLOSURE

The present disclosure provides an electrode assembly manufacturing apparatus and an electrode assembly manufacturing method, which press and fix an upper surface and a lower surface of a stack in which an electrode and a separator are stacked, and then heat and press the stack.

The present disclosure provides an electrode assembly manufacturing apparatus and an electrode assembly manufacturing method, which secure uniformity of adhesive force of an electrode assembly through two pressing processes.

In accordance with an aspect, an electrode assembly manufacturing apparatus for fabricating a stack that may include a first electrode, a second electrode, and a second electrode section of a separator between the first and the second electrodes may include a stack table, a gripper, and a first press unit. The stack table may be configured for supporting the stack. The gripper may be configured for fixing the stack. The first press unit may be configured for heating and compressing the stack fixed by the gripper.

In some arrangements, in fixing the stack, the gripper may hold the stack in any one or any combination of a same position relative to the first press unit, a same orientation relative to the first press unit, and a same configuration. In some arrangements, in holding the stack in a same configuration, one or more layers of the stack, e.g., adjacent first and second electrodes, may be held in relative positions to each other. In some such arrangements as well as in other arrangements, in holding the stack in a same configuration, one or more of the surfaces of the stack pressed by the gripper, e.g., top and bottom surfaces of the stack, may be held in relative positions to each other.

In some arrangements, the first press unit may include a pair of pressing blocks that may be configured for compressing opposing surfaces of the stack. The pair of pressing blocks may be moveable in directions towards each other and configured for compressing either one or both of the stack and the gripper.

In some arrangements, the gripper may be in a form of a column or plate extending in a direction parallel to either one or both of an upper plane defined by an upper surface of the stack and a lower plane defined by a lower surface of the stack. The gripper may fix, e.g., by pressing, a portion of either one or both of the upper surface and the lower surface of the stack to fix the stack. At least one of the pair of pressing blocks of the first press unit may include a gripper hole having a shape corresponding to a shape of the gripper.

In some arrangements, the electrode assembly manufacturing apparatus may further include a second press unit. The second press unit may be configured for heating and compressing the stack. The pair of pressing blocks of the second press unit may have a flat pressing surface that is in contact with the stack and presses the stack.

In some arrangements, the electrode assembly manufacturing apparatus may further include a second press unit. The second press unit may be configured for heating and pressing the stack. The gripper may be in a form of a column or plate extending in a direction parallel to either one or both of an upper plane defined by an upper surface of the stack and a lower plane defined by a lower surface of the stack. The gripper may fix a portion of either one or both of the upper surface and the lower surface of the stack. Either one or both of the pair of pressing blocks of the first press unit may have a flat pressing surface that may be in contact with the stack and that may compress the stack. Either one or both of the pair of pressing blocks of the second press unit may include one or more second pressing block grooves that may be configured to overlie one or more corresponding compressed portions of the stack.

In some arrangements, the gripper may be in a form of a column or plate that may extend in a direction parallel to either one or both of an upper plane defined by an upper surface of the stack and a lower plane defined by a lower surface of the stack. In some such arrangements, the gripper may press a portion of either one or both of the upper surface and the lower surface of the stack to fix the stack. In some arrangements, either one or both of the pair of pressing blocks of the first press unit may press the gripper such that the gripper may press the stack.

In some arrangements, either one or both of the first and the second press units may include a press heater for heating their respective pairs of pressing blocks.

In some arrangements, a length and a width of the pressing surfaces of the pair of pressing blocks may be greater than a corresponding length of the stack and a corresponding width of the stack.

In some arrangements, the electrode assembly manufacturing apparatus may further include a separator supply unit, a first electrode supply unit, and a second electrode supply unit. The separator supply unit may be configured for supplying the separator to the stack table. The first electrode supply unit may be configured for stacking the first electrode on a first electrode section of the separator supported by the stack table. The first electrode supply unit may include a first electrode seating table and a first transfer head. The first electrode seating table may be configured for seating the first electrode before the first electrode is stacked on the separator The first transfer head may be configured for temporary fixation of the first electrode and for transferring the first electrode from the first electrode seating table to the first electrode section of the separator supported by the stack table while the first electrode is temporarily fixed to the first transfer head. The second electrode supply unit may be configured for stacking the second electrode on the second electrode section of the separator when the second electrode section is supported by the stack table. The second electrode supply unit may include a second electrode seating table and a second transfer head. The second electrode seating table may be configured for seating the second electrode before the second electrode is stacked on the separator. The second transfer head may be configured for temporary fixation of the second electrode and for transferring the second electrode from the second electrode seating table to the second electrode section of the separator supported by the stack table while the second electrode is temporarily fixed to the second transfer head.

In some such arrangements, the first transfer head and the second transfer head may each include a vacuum device to which to temporarily fix the first and the second electrodes, respectively.

In some arrangements, the electrode assembly manufacturing apparatus may further include a rotating unit configured for rotating the stack table. The first electrode supply unit may be provided on a first side of the rotating unit. The second electrode supply unit may be provided on a second side of the rotating unit opposite the first side. The rotating unit may rotate the stack table to the first side to face the first transfer head when the first electrode is stacked and may rotate the stack table to the second side to face the second transfer head when the second electrode is stacked.

In some arrangements, the rotating unit may be configured for alternately rotating the stack table in a direction of the first electrode supply unit and a direction of the second electrode supply unit.

In some arrangements, the first press unit may press the stack for a time in a range from 5 seconds to 20 seconds within an environment having an ambient temperature in a range from 45° C. to 75° C. and with an applied pressure in a range from 1 MPa to 2.5 MPa.

In some arrangements, the electrode assembly manufacturing apparatus may further include a second press unit configured for heating and compressing the stack. The second press unit may press the stack pressed by the first press unit for a time in a range from 5 seconds to 60 seconds within an environment having an ambient temperature in a range from 50° C. to 90° C. and with an applied pressure in a range from 1 MPa to 6 MPa.

In accordance with another aspect, an electrode assembly may be manufactured by a process. In this process, a first electrode, a separator, and a second electrode may be supplied and stacked to manufacture a stack of the first and the second electrodes with the separator disposed between the first and the second electrodes. The stack may be heated and pressed with a first press unit while fixing the stack using a gripper. The stack may be heated and pressed using a second press unit after the step of heating and pressing the stack with the first press unit.

In some arrangements of the process, the step of heating and pressing the stack using the second press unit is performed after the gripper is removed.

In some arrangements, the second press unit may be the first press unit with the gripper removed.

In some arrangements of the process, a surface of the stack on which the gripper is not located is pressed by step of heating and pressing the stack with the first press unit.

In some arrangements, the gripper attaches to a surface of the stack and presses the surface of the stack at the location the gripper attaches to the surface of the stack during the step of heating and pressing the stack with the first press unit.

In some arrangements, the stack is pressed for a time in a range from 5 seconds to 20 seconds within an environment having an ambient temperature in a range from 45° C. to 75° C. and with an applied pressure in a range from 1 MPa to 2.5 MPa during the step of heating and pressing the stack with the first press unit.

In some arrangements, the stack is pressed for a time in a range from 5 seconds to 60 seconds within an environment having an ambient temperature in a range from 50° C. to 90° C. and with an applied pressure in a range from 1 MPa to 6 MPa during the step of heating and pressing the stack with the second press unit.

In accordance with another aspect, an electrode assembly manufacturing apparatus for fabricating a stack may include a stacked table, a separator supply unit, a first electrode supply unit, a second electrode supply unit, hey gripper, a first press unit, and a second press unit. The stack may include a first electrode, a second electrode, a first electrode section of a separator underlying the first electrode, and a second electrode section of the separator between the 1st and the second electrodes. The stack table may be configured for supporting the stack. The separator supply unit may be configured for supplying the separator to the stack table. The first electrode supply unit may be configured for stacking the first electrode on a first electrode section of the separator supported by the stack table. The second electrode supply unit may be configured for stacking the second electrode on a second electrode section of the separator when the second electrode is supported by the stack table. The gripper may be configured for fixing the stack. The first press unit may be configured for heating and compressing the stack fixed by the gripper. The second press unit may be configured for heating and compressing the stack.

In some arrangements in accordance with any of the foregoing, the stack within an electrode assembly being manufactured may include a plurality of first electrodes and a plurality of second electrodes. In such arrangements, the plurality of first electrodes and the plurality of second electrodes may be alternately disposed between sections of the separator.

According to the electrode assembly manufacturing apparatus and the electrode assembly manufacturing method according to the present disclosure, it is possible to prevent or at least inhibit electrodes of an electrode assembly from being distorted during the compression of the electrode assembly by fixing the stack in which the electrode and the separator are stacked and then heating and pressing the stack.

Further, it is possible to provide adhesive force to a portion in which adhesive force is not otherwise provided because that portion is not heated and pressed by a member for fixing the stack. Such adhesive force may be provided to that portion by removing the member for fixing the stack and then heating and pressing the stack. Such adhesive force may then be provided uniformly within the electrode assembly.

DETAILED DESCRIPTION

Where the specification states that a part "includes" a certain element or that a specific structure or shape is "characterized", unless otherwise stated, such terms do not mean that other components or other structures and shapes are excluded, and indeed other components, structures, and shapes may be included.

Since the arrangements described herein may be variously transformed, specific arrangements are presented and described in detail in the detailed description. However, the disclosure of such arrangements is not intended to limit the content of according to those arrangements, and should be understood to include all transformations, equivalents, and substitutes included in the spirit and scope of the present disclosure.

Hereinafter, examples of the present invention will be described in detail with reference to the drawings. However, the drawings are for illustrative purposes only, and the scope of the present invention is not limited or intended to be limited by the drawings.

Figure 1:
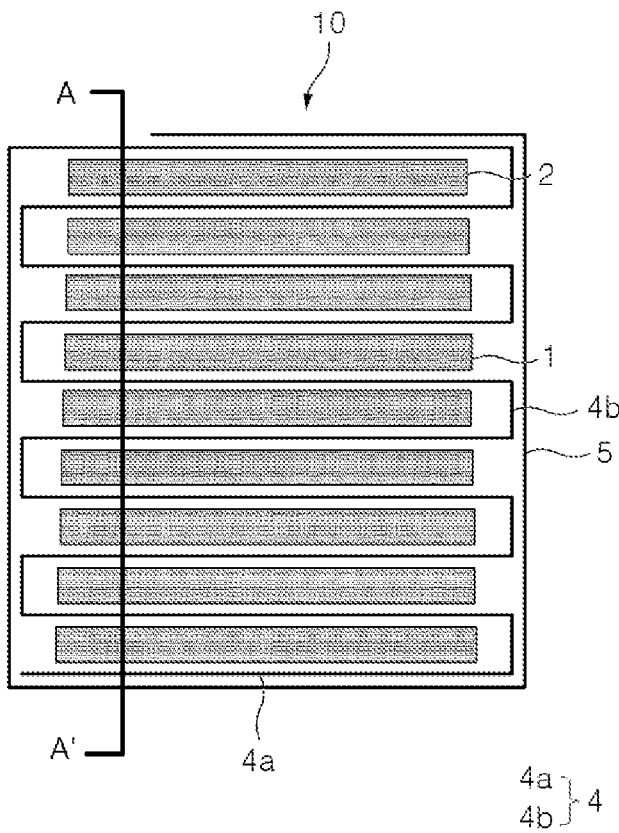
FIG. 1 is a cross-sectional elevation view illustrating an electrode assembly according to an exemplary embodiment.
Figure 2:
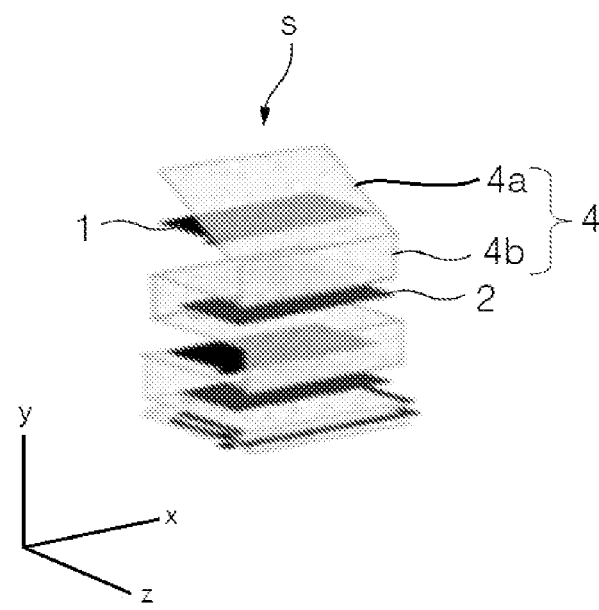
FIG. 2 is a perspective view illustrating a stack of the electrode assembly of FIG. 1.

Referring now to FIGS. 1 and 2, an electrode assembly 10 may include a stack S and a second separator 5 that may surround the stack S.

As shown, in the stack S, a first electrode 1 and a second electrode 2 may be alternately disposed between spacer sections 4*a* of first separator 4. As further shown, first separator 4 may be folded in a zigzag manner to form the spacer sections 4*a*.

Figure 3:
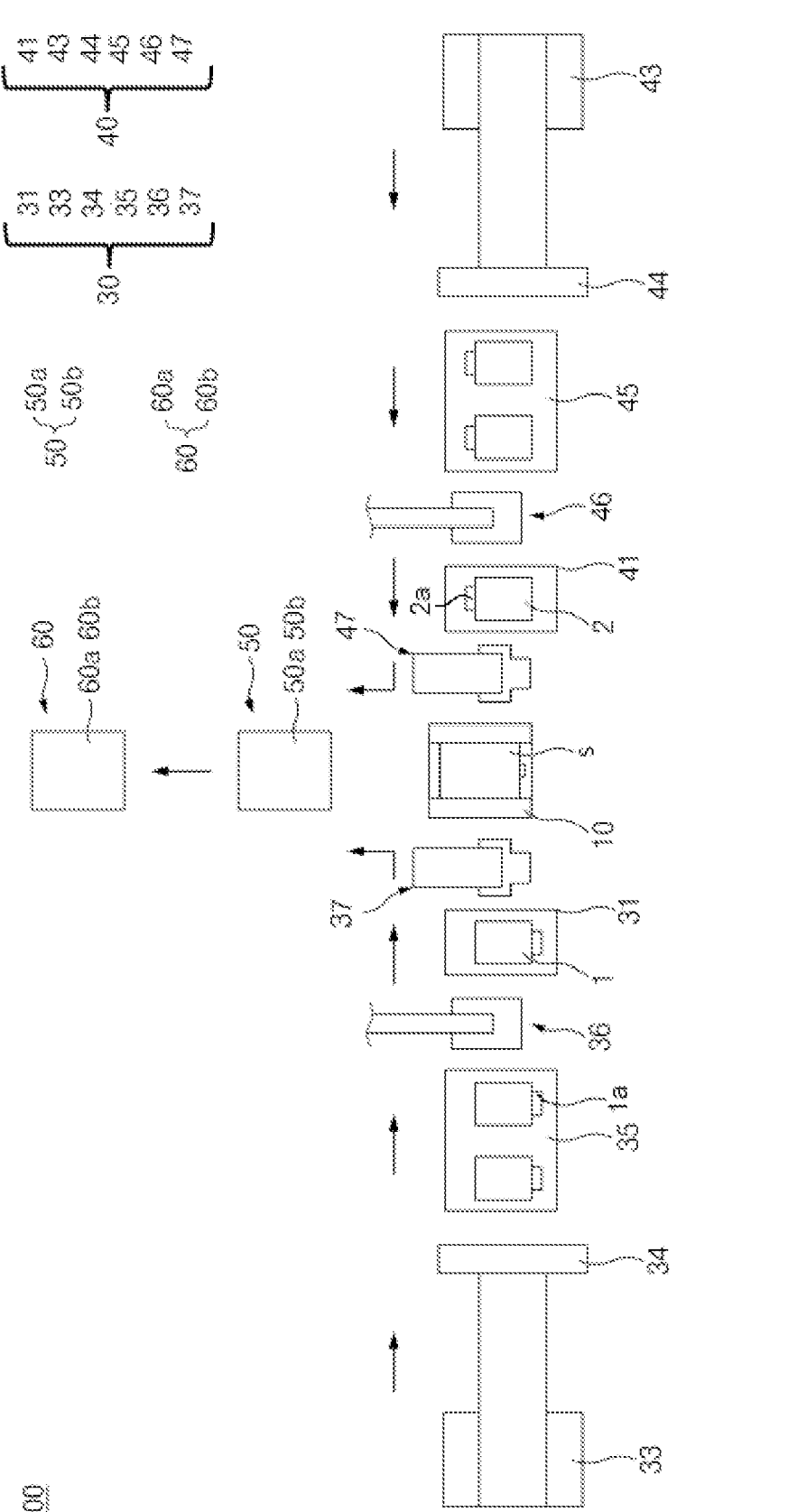
FIG. 3 is a plan view illustrating an electrode assembly manufacturing apparatus according to another exemplary embodiment.
Figure 4:
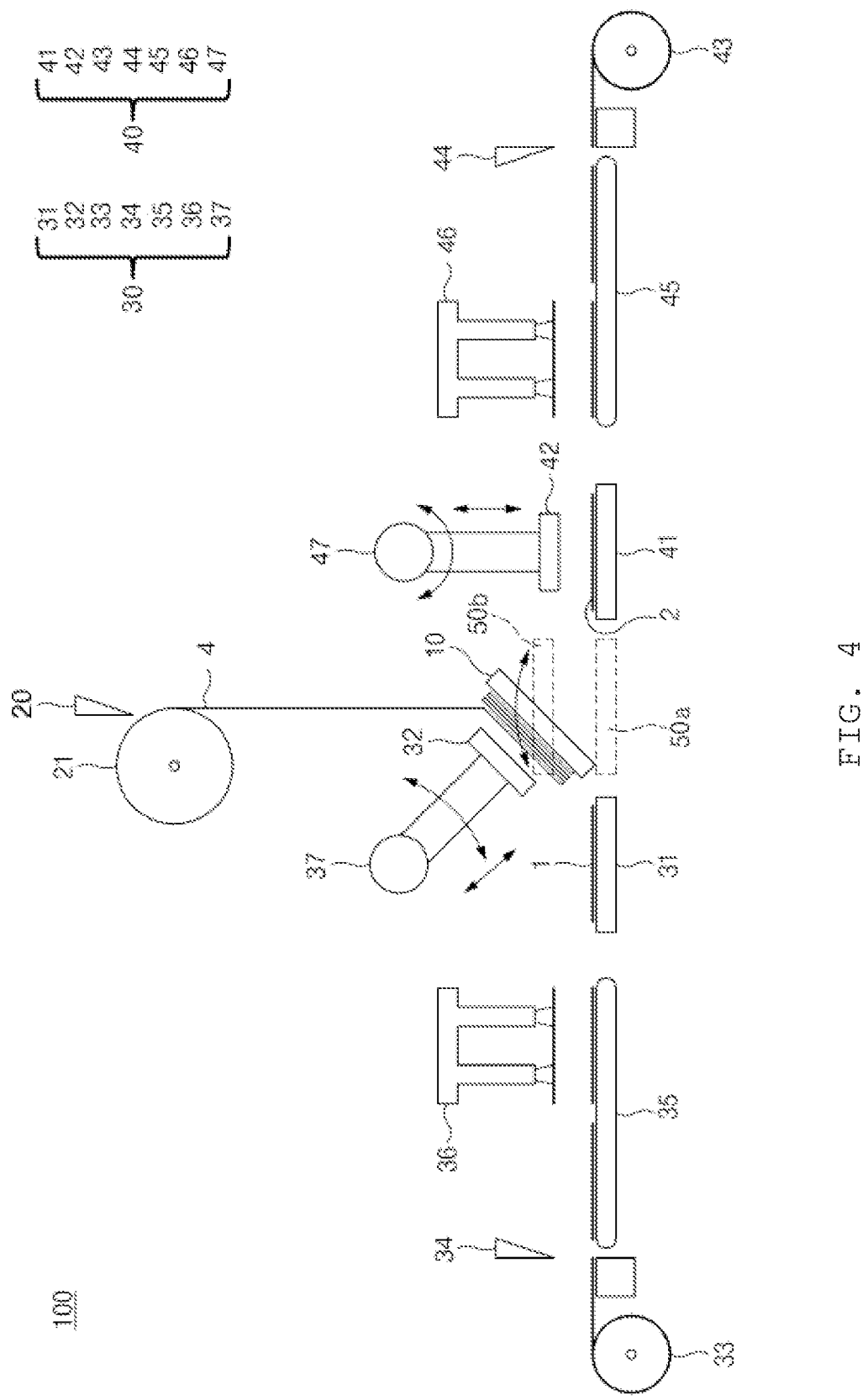
FIG. 4 is an elevation view illustrating the electrode assembly manufacturing apparatus of FIG. 1.

Referring to FIGS. 3-5, the electrode assembly manufacturing apparatus 100 includes a stack table 10, a separator supply unit 20, a first electrode supply unit 30, a second electrode supply unit 40, a first press unit 50, and a second press unit 60.

The stack table 10 has one support surface on which a first combination of a first electrode 1, a first section of a separator 4, and a second electrode 2 are stacked in that order. A stacked stack S includes the first combination and further first electrodes 1, second electrodes 2, and additional sections of separator 4 placed between the first and the second electrodes mounted on the first combination. The separator 4 is folded in a zigzag manner to form the spacer sections 4*a* of the separator 4 and corresponding side sections 4*b* of the separator on opposite sides of each of the spacer sections of the separator. The side sections 4*b* include folding parts of the stack S. In this manner, each spacer section 4*a* of the separator 4 is disposed between respective ones of the first electrodes 1 and respective ones of the second electrodes 2 within the stack S in which each of the first electrodes 1 are alternately disposed with a respective one of the second electrodes 2.

The stack table 10 is rotatable in one direction towards each first electrode 1 being supplied to allow the first electrode to be stacked on a respective spacer section of the separator 4 supported by the stack table 10 and each prior stacked electrode and separator spacer section, if any, and is rotatable in another direction opposite the one direction towards each second electrode 2 being supplied to allow the second electrode to be stacked on a respective spacer section of the separator 4 supported by the stack table 10 and each prior stacked electrode and separator spacer section. Accordingly, the electrode assembly manufacturing apparatus 100 may further include a rotating unit (not illustrated) for rotating the stack table 10. For more information regarding such a rotating unit, see Korean Patent Application Publication No. 10-2020-0023853, the entire contents of which are incorporated herein by reference.

In the electrode assembly manufacturing apparatus 100, the first electrode supply unit 30 is located on one side of the stack table 10, and the second electrode supply unit 40 may be located on the other side of the stack table. In the configuration of manufacturing apparatus 100 shown, the rotating unit may alternately rotate the stack table 10 in the direction of the first electrode supply unit 30 and the direction of the second electrode supply unit 40.

For example, the separator supply unit 20 may be located above the stack table 10, that is, along the stacking direction of the stack S. In this configuration, the first electrode supply unit 30 may be located at the left side of the stack table 10, and the second electrode supply unit 40 may be located on the right side of the stack table based on the stacking direction of the stack S.

In the configuration of manufacturing apparatus 100 shown, the rotating unit may rotate the stack table 10 so that the stack table faces a first transfer head 32, or other first attachment device for temporarily holding the first electrode 1, when stacking the first electrode 1. The rotating unit may rotate the stack table so that the stack table faces a second transfer head 42, or other second attachment device for temporarily holding the second electrode 2, when stacking the second electrode 2.

In using the electrode assembly manufacturing apparatus 100, a section of the separator 4 is supplied by the separator supply unit 20 and placed, and in some arrangements, mounted, onto the stack table 10. When the rotating unit rotates the stack table to the left, the first electrode 1 may be supplied from the first electrode supply unit 30 onto the supplied spacer section 4a of the separator 4. In addition, the rotating unit may rotate the stack table 10 to the right, in which such rotation may occur at the same time as the separator 4 is supplied. In this rotational configuration of the rotating unit, the separator 4 may form a first pocket in the form of a left pocket covering a lower surface, a right surface, and an upper surface of the first electrode 1 that is the first electrode of stack S placed over stack table 10 in which the upper surface of the first electrode may be covered by a spacer section 4a of the separator. In this configuration, the second electrode 2 may be supplied from the second electrode supply unit 40 and onto the section of the separator covering the upper surface of the first electrode 1.

When the above process is repeated, the separator 4 may be provided from the separator supply unit 20 to overlie the stack table 10 in the forms of left pockets and right pockets oppositely configured to the left pockets. In such configurations, the left and the right pockets form alternating respective left and right openings as each spacer section 4a of the separator 4 is placed to overlie the stack table 10 in which such left and right openings are configured to receive the first electrodes 1 and the second electrodes 2, supplied by the first electrode supply unit 30 and the second electrode supply unit 40, respectively. Further, side sections 4a of the separator 4, which may be in the form of folded parts when the separator is folded (See FIG. 2), may be provided at positions facing the left and right openings. In some alternative arrangements, which may be a mirror arrangement to the arrangement of electrode assembly manufacturing apparatus 100, the separator 4 may form a first pocket in the form of a right pocket covering a lower surface, a left surface, and an upper surface of the second electrode 2. In such a mirror arrangement, the second electrode 2 may be the first electrode of stack S placed over stack table 10.

The stack table 10 may further include a table body (not illustrated) which determines a shape of the stack table 10 and a table heater (not illustrated), which for example may be a resistor coil on, under, or embedded within the table body. The table heater may heat the table body and thereby heat the stack S resting on the stack table 10.

The table heater may heat the stack S prior to the stack S being heated and compressed by a first press unit 50 of the electrode assembly manufacturing apparatus 100. This pre-heating of the stack S by the table heater may reduce the press time needed for sufficient pressing by the first press unit 50 by shortening the time for heat conduction to the center of the stack S.

In addition, when the stack S preheated by the table heater is pressed and fixed by a gripper 51 of the first press unit 50, described further herein, the portions of the stack underlying or overlying the points of contact of the stack S by the gripper that are compressed by the gripper may be primarily bonded, and may be secondarily bonded by the pressing of the first press unit 50.

With reference to FIGS. 3 and 4, as in the example of the electrode assembly manufacturing apparatus 100, separator supply unit 20 may be configured for supplying the separator 4 to the stack table 10. For more information regarding such a separator supply unit, see Korean Patent Application Publication No. 10-2020-0023853. For example, as shown in FIG. 4, the separator supply unit 20 may be located above the stack table 10. In addition, the separator supply unit 20 may include a separator roll 21 on which the separator 4 may be wound. The separator 4 wound on the separator roll 21 may be supplied to the stack table 10 by gravity while being gradually unwound.

The separator supply unit 20 is formed with a passage through which the separator 4 passes. and the separator supply unit 20 may include a separator heating unit (not illustrated) for heating the passing separator 4. For more information regarding such a separator heating unit, see Korean Patent Application Publication No. 10-2020-0023853.

The separator heating unit may include a pair of bodies (not illustrated) and a separator heater (not illustrated) for heating the body. The pair of bodies may be located on opposing sides of the separator 4 while being spaced apart from each other by a predetermined distance so as to allow the separator 4 to pass through. The separator may, for example, pass through, while not being in contact with, the separator heating unit so that the separator 4 may be heated in a non-contact manner. In some arrangements, each body of the pair of bodies of the separator heating unit may be formed in, for example, a quadrangular block shape.

As in the example of the electrode assembly manufacturing apparatus 100, the first electrode supply unit 30 may be configured for supplying the first electrode to the stack table 10 and for stacking the first electrode 1 on the stack table 10. The first electrode supply unit 30 may include a first electrode seating table 31 on which the first electrode 1 is seated before being stacked on the stack table 10.

Further, the first electrode supply unit 30 may include a first electrode roll 33, a first cutter 34, a first conveyor 35, and a first electrode supply head 36. In the first electrode supply unit 30, one of the first electrodes 1 may be supplied to the first electrode seating table 31 while a first electrode sheet from which the first electrodes 1 are formed wound around the first electrode roll 33 may be gradually unwound. The first cutter 34 may cut the first electrode 1 from the first electrode sheet supplied from the first electrode roll 33 to a preset length. The first cutter 34 may cut the first electrode sheet such that a first electrode tab 1a protrudes from an end of the first electrode 1.

The first electrode 1 cut by the first cutter 34 may be supplied to the first conveyor 35, and the first conveyor, which may be in the form of a belt as shown, may move the first electrode 1 to the first electrode seating table 31. The first electrode supply head 36 may pick up (e.g., via a vacuum fitting, suction cups or similar fitting, or other temporary form of attachment such as a magnetic attachment) the first electrode 1 placed on the first conveyor 35 and position the first electrode 1 on the first electrode seating table 31.

As further shown, the first electrode supply unit 30 may include a first transfer head 32 and a first moving unit 37 from which the first transfer head may extend and may be oscillated.

The first transfer head 32 may pick up (e.g., via a vacuum fitting, suction cups or similar fitting, or other temporary form of attachment such as a magnetic attachment) the first electrode 1 seated on the first electrode seating table 31. In some arrangements, the first transfer head 32 may include a vacuum suction unit (not illustrated) on the bottom surface of the transfer head that may be configured for suctioning the first electrode 1 via a vacuum suction port to affix the first electrode 1 to the bottom surface of the first transfer head 32. A passage formed in the first transfer head 32 may connect the vacuum suction port and a vacuum suction device (not illustrated).

The first moving unit 37 may be configured for picking up the first electrode 1 seated on the first electrode seating table 10 and for moving the first transfer head 32 to a position overlying the stack table 10 where the transfer head 32 may release, e.g., by reducing or removing vacuum suction or other force being applied to the first electrode 1 to hold the first electrode against the transfer head. In this manner, the first transfer head may transfer the first electrode 1 from the first electrode seating table 31 onto a section of the separator resting on or overlying the stack table 10 via other electrodes 1, 2.

The second electrode supply unit 40 may have or may essentially have a mirror configuration of the first electrode supply unit 30. In this manner, the second electrode supply unit 40 may supply the second electrode 2 to a portion of the stack S resting, e.g., mounted, on the stack table 10 at that time and stack the second electrode 2 on such portion of the stack S on the stack table 10.

The second electrode supply unit 40 may include a second electrode seating table 41 on which the second electrode 2 is seated before being moved and stacked onto the portion of the stack S on the stack table 10.

The second electrode supply unit 40 may include a second electrode roll 43 around which a second electrode sheet from which the second electrode 2 is formed is wound, a second cutter 44 for cutting at regular intervals the second electrode sheet to form the second electrodes 2 in a predetermined size while unwinding the second electrode sheet from the second electrode roll 43, a second conveyor for moving the second electrode 2 cut by the second cutter 44, and a second electrode supply head 46 for picking up the second electrode 2 moved by the second conveyor 45 and seating the second electrode 2 on the second electrode seating table 41.

Like the first cutting 34, the second cutter 44 may cut the second electrode sheet such that the formed second electrodes 2 each include a second electrode tab 2a protruding from an end of the second electrode 2.

Further, the second electrode supply unit 40 may include a second transfer head 42 for picking up the second electrode 2 seated on the second electrode seating table 41 and a second moving unit 47 configured for moving the second transfer head 42 to a position overlying the stack table 10 where the transfer head 42 may release, e.g., by reducing or removing vacuum suction or other force being applied to the second electrode 2 to hold the second electrode against the transfer head, so that the second transfer head 42 may stack the second electrode 2 onto a portion of the stack S on the stack table 10 at that time. The second transfer head 42 may be formed in the same manner as the first transfer head 32 such that the second electrode 2 may be temporarily affixed to the second transfer head 42 on a bottom surface of the second transfer head 42.

The stack S may be moved to a press unit by a gripper 51 that is configured to grip the stack on the stack table 10 and then move the stack to the press unit, where heat press operations are performed. The press unit may be divided into the first press unit 50 and the second press unit 60.

Figure 5A:
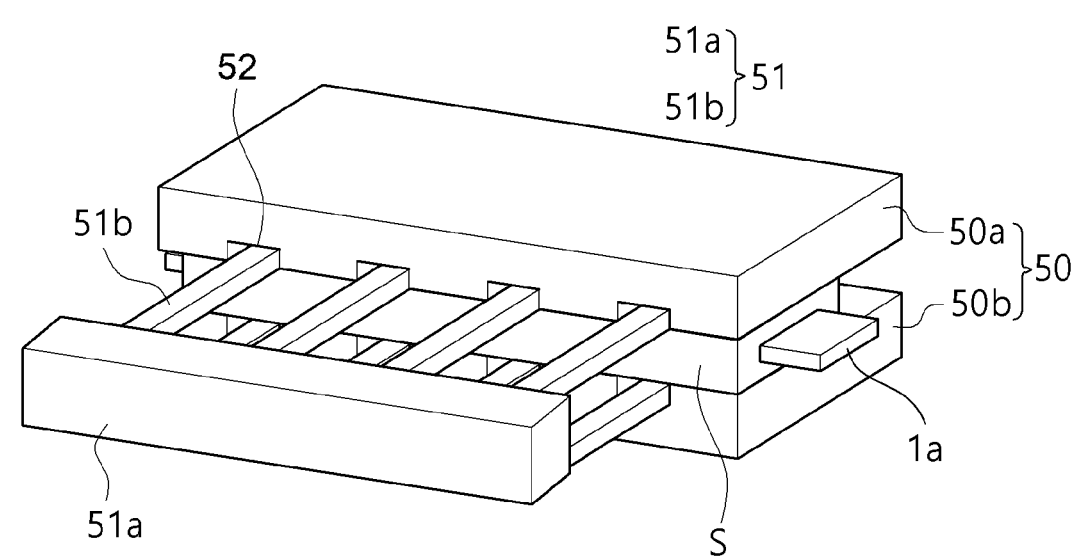
FIG. 5A is a perspective view illustrating a first press unit and gripper according to another exemplary embodiment.
Figure 5B:
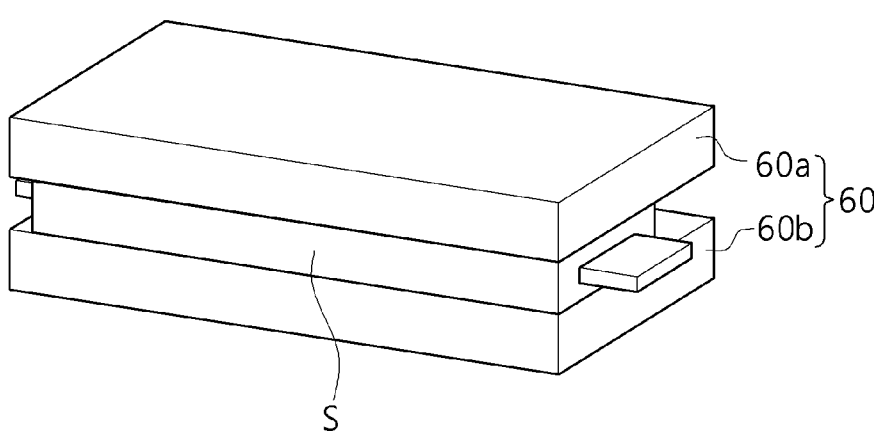
FIG. 5B is a perspective view illustrating a second press unit according to another exemplary embodiment.

Referring to FIGS. 5A and 5B, the first press unit 50 may primarily heat and press the stack S in a fixed state. The first press unit 50 includes a pair of first pressing blocks 50a and 50b and may further include a gripper 51 configured for fixing the stack S such that the electrodes in the stack are not disturbed during the pressing of the stack by the press unit. In fixing the stack S, the gripper 51 may hold the relative positions of each of the first electrodes 1, the second electrodes 2, and the spacer sections 4a of the separator 4 positioned between the first and the second electrodes. As in the example shown, to hold these relative positions, the gripper 51 may press the upper and lower surfaces of the stack S. In some arrangements, in fixing the stack S, the gripper may hold the stack in any one or any combination of a same position relative to the first press unit 50 and in particular the pair of first pressing blocks 50a and 50b, a same orientation relative to the first press unit, and a same configuration. In some arrangements, in holding the stack S in a same configuration, one or more layers of the stack, e.g., the first and the second electrodes 1 and 2, may be held in relative positions to each other. In some such arrangements as well as in other arrangements, in holding the stack in a same configuration, one or more of the surfaces of the stack pressed by the gripper, e.g., the upper and the lower surfaces, i.e., the top and the bottom surfaces, of the stack S, may be held in relative positions to each other.

The pair of first pressing blocks 50a and 50b of the first press unit 50 may move in directions towards and away from each other. In moving towards each other, the pair of first pressing blocks 50a and 50b may compress either one or both of the stack S and the gripper 51.

In this manner, the first press unit 50 may heat and compress the stack S to reduce or eliminate the spaces between the first electrodes 1 and their adjacent spacer sections 4a of the separator 4 and the spaces between the second electrodes 2 and their adjacent spacer sections included in the stack S.

As shown, each pressing surface of the pair of first pressing blocks 50a and 50b configured for contact with and compression of the stack S may define a plane. At least one of the pair of first pressing blocks 50a and 50b may include a gripper groove 52 having a shape corresponding to a fixing part 51b of the gripper 51 described further herein. In the example shown in FIG. 5A, each of the pair of first pressing blocks 50a and 50b include four gripper grooves 52 to correspond with four fixing parts 51b. However, there may be a greater or fewer number of gripper grooves. Preferably, the number of gripper grooves should match the number of fixing parts to be used.

The gripper 51 may include a main body 51a and a plurality of fixing parts 51b. As in the arrangement shown, the main body 51a may have a length x and a height y (such height being measured in the direction of stacking of the stack S) that is the same or approximately the same as the length and height of the stack S. In some other arrangements, the main body may be longer than the length x and have a greater height than the height y of the stack S. The fixing parts 51*b* extend from a side surface of the main body 51*a*. The fixing parts 51*b* preferably may be in the form of a rod, column, or plate that extends towards the stack S when the gripper 51 is in proper position in the press unit 50. In this proper position, the fixing parts 51*b* have a width z in the direction towards the stack S. Here, the length x of the stack S may refer to the portion of the stack having the longest distance from one end to the other end of the stack S, and the height y may refer to the distance in the stacking direction of the stack S, and the width z may mean a distance measured in a direction perpendicular to the directions the x and y distances are measured, e.g., a distance measured across the upper surface of the stack S away from or towards the gripper 51.

The fixing parts 51*b* may be provided in two rows in which one row aligns with the gripper grooves 52 of pressing block 50*a* while the other row of fixing parts aligns with the gripper grooves 52 of pressing block 50*b*. The position of each of the fixing parts 51*b* may be adjustable in the height direction of the main body 51*a*. In this manner, each of the fixing parts 51*b* may be placed in contact with, and preferably along the width of, the upper and lower surfaces of the stack S to fix the position of the stack S and the relative positions of the first electrode 1 and the second electrode 2 within the stack S.

In some arrangements, in operation, the first press unit 50 may compress the stack S, e.g., using the pair of pressing blocks 50*a* and 50*b*, for a time in a range of 5 seconds to 20 seconds in an environment with an ambient temperature in a range from 45° C. to 75° C. and with an applied pressure in a range from 1 MPa to 2.5 MPa.

In some arrangements, the second press unit 60 may heat and compress the stack S that was previously heated and compressed by the first press unit 50 and thereby secondarily compress the already primarily compressed stack S.

As shown in FIG. 5B, the second press unit 60 includes a pair of second pressing blocks 60*a* and 60*b*. The pair of pressing blocks 60*a* and 60*b* may be moved in directions towards and away from each other. In moving towards each other, the pair of pressing blocks 60*a* and 60*b* may press upon the upper and lower surfaces of the stack S to compress the stack.

Figure 5C:
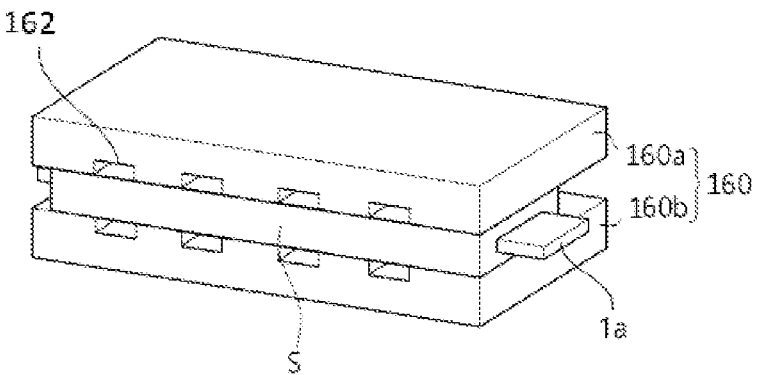
FIG. 5C is a perspective view illustrating a second press unit according to another exemplary embodiment.

As shown, each pressing surface of the pair of second pressing blocks 60*a* and 60*b* configured for contact with and compression of the stack S may define a plane. As in the example shown, in some arrangements, grooves such as those for the fixing parts 51*b* may be excluded from the second pressing blocks 60*a* and 60*b*. In some other arrangements, at least one of the pair of second pressing blocks 60*a* and 60*b* may include a groove. With reference to FIG. 5C, in some arrangements, such grooves may be generally in the form of second pressing block grooves 162 of second press unit 160. However, unlike second pressing block grooves 162, the grooves of a pair of second pressing blocks of a second pressing unit (not illustrated) for use following the use of first press unit 50 and gripper 51 extend along areas of the surface or surfaces of the stack S that were compressed by either one or both of the first pressing blocks 50*a* and 50*b*. In this manner, such grooves of such a second pressing blocks define protrusions of the pressing blocks that provide the pressing surfaces for pressing the stack S.

In some arrangements, in operation, the second press unit 60 may compress the stack previously compressed by the first press unit 50 for a time in a range of 5 seconds to 60 seconds within an environment having an ambient temperature in a range of 50° C. to 90° C. and with an applied pressure in a range of 1 MPa to 6 MPa. In some arrangements, the second press unit 60 may heat and press only a portion of the stack S on which the gripper 51 was located, for example, locations at which the stack S has not been heated and pressed by the first press unit 50. In some other arrangements, the second press unit 50 may heat and press all areas of the top and the bottom surfaces of the stack S.

In some arrangements, each of the pair of first pressing blocks 50*a* and 50*b* of the first press unit 50 include gripper grooves having a shape corresponding to the fixing part 51*b* of the gripper 51, and each of the pair of second pressing blocks 60*a* and 60*b* of the second press unit 60 have flat pressing surfaces without any gripper grooves.

In some arrangements, the first press unit 50 may compress the heated stack S initially while the upper surface and the lower surface of the stack S are fixed with the gripper 51. In this manner, in the region or regions of the stack over and under which the gripper 51 is not located, the spaces between the first electrodes 1 and their adjacent spacer sections 4*a* of the separator 4 may be reduced or eliminated while bonding such electrodes 1 and their adjacent spacer sections and the spaces between the second electrodes 2 and their adjacent spacer sections may be reduced or eliminated while bonding such electrodes 2 and their adjacent spacer sections.

In some such arrangements, the second press unit 60 may compress and may further heat the previously heated stack S, which has already been preliminarily bonded by the first press unit 50, and from which the gripper 51 is removed. The second press unit 60 may thus reduce or eliminate the spaces between, while bonding, the first electrodes 1 and their adjacent spacer sections 4*a* of the separator 4 and reduce or eliminate the spaces between and thereby bond the second electrodes 2 and their adjacent spacer sections in the region or regions of the stack S over and under where the gripper 51 previously pressed upon the stack S during the initial press by the first press unit 50. In some such arrangements, each of the pair of second pressing blocks 60*a* and 60*b* may be a quadrangular block in the form of a rectangular parallelepiped. In such arrangements, the pair of second pressing blocks 60*a* and 60*b* may have the flat pressing surfaces described previously herein.

Figure 6:
FIG. 6 is a perspective view illustrating a first press unit and gripper according to another exemplary embodiment.
Figure 6:
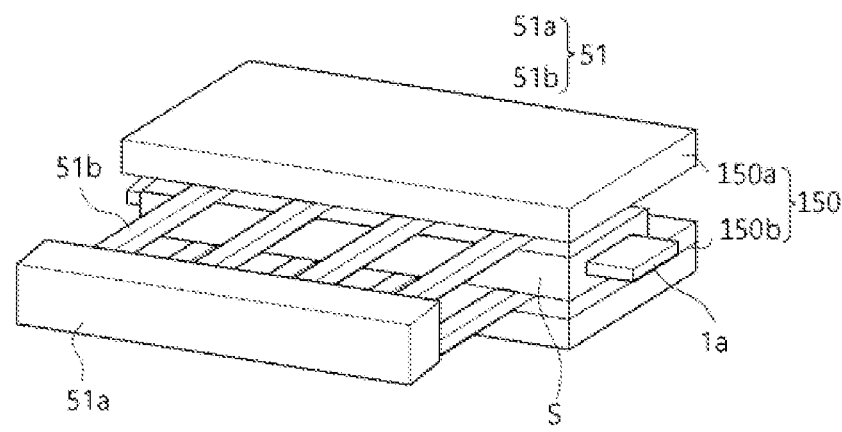
Figure 7:
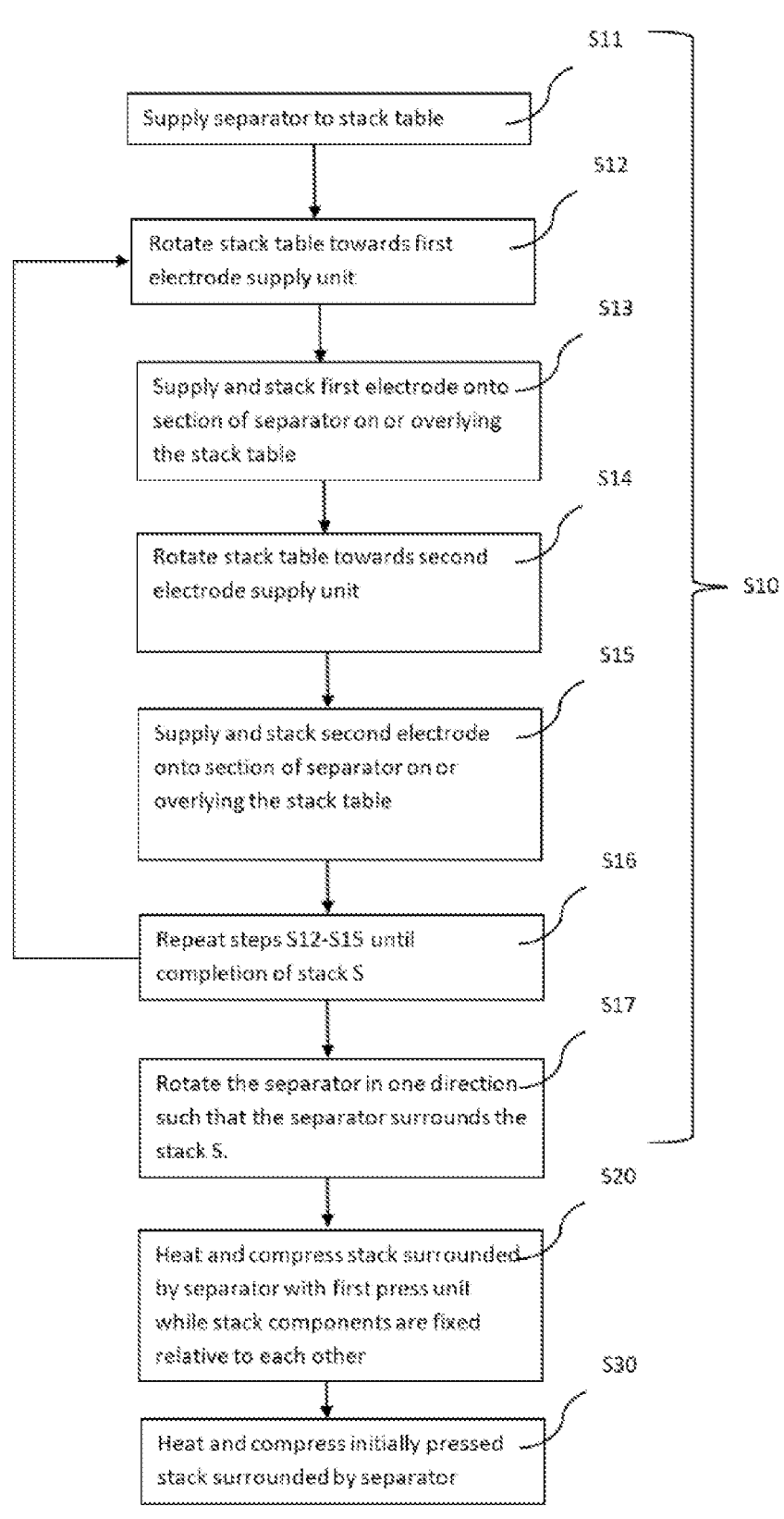
FIG. 7 is a process flow diagram of an electrode assembly manufacturing process according to another exemplary embodiment.

Referring now to FIG. 6, in some arrangements, a first press unit 150 may be in the same form as the first press unit 50 with the exception that a pair of first pressing blocks 150*a* and 150*b* of the first press unit 150 may exclude gripper grooves 52. Instead, each of the pair of first pressing blocks 150*a* and 150*b* of the first press unit 50 may have the flat pressing surfaces, like the pair of second pressing blocks 60*a* and 60*b*. In this manner, when the pair of first pressing blocks 150*a* and 150*b* move toward each other, the flat pressing surfaces of the first pressing blocks press the fixing parts 51*b* of the gripper and the gripper 51 thereby presses the top and the bottom surfaces of the stack S. In some such arrangements, as shown in FIG. 5C, each of the pair of second pressing blocks 160*a* and 160*b* of the second press unit 160 may have second pressing block grooves 162 located where the gripper 51 pressed the top and the bottom surfaces of the stack S during the pressing by the first press unit 150. In this manner, during pressing by the second press unit 160, the grooved regions of the pair of second pressing blocks 160*a* and 160*b* may be configured to not contact and thereby to not press the stack S. As further shown in FIG. 5C, the second pressing block grooves 162 may have a shape corresponding to the fixing parts 51*b* of the gripper 51.

In some arrangements, the fixing part 51b may include a thermally conductive material, which preferably may be a metallic material and more preferably aluminum or an aluminum alloy, iron or an iron alloy, or a material containing a combination of aluminum and iron. By conducting heat to the stack S, when the first press unit compresses the stack S fixed by the gripper 51, the electrodes 1, 2 and their adjacent spacer sections 4a of the separator 4 may be bonded as the spaces between them are reduced or eliminated.

In some arrangements, the second press unit 60 may not compress regions of the stack S on which the gripper 51 was previously located but may instead only compress regions of the stack S where the gripper was not previously located and upon which the press unit 50 did not press during the initial pressing. Such compression by the second press unit 60 may reduce or eliminate the spaces between the electrodes 1, 2 and their adjacent spacer sections 4a of the separator 4 and thereby bond the respective electrodes with the spacer sections.

Further, each of the pair of first pressing blocks 50a and 50b may be a quadrangular block in the form of a rectangular parallelepiped. In such arrangements, the pair of first pressing blocks 50a and 50b may have the flat pressing surfaces described previously herein.

Either one or both of the first and second press units 50 and 60 preferably include a press heater (not illustrated), configured for heating the respective pair of first and second pressing blocks 50a, 50b, 60a, and 60b such that the blocks may heat the stack S of first and second electrodes 1 and portions of the separator 4 when pressing upon the stack. In this manner, when the stack S is pressed with the first and second press units 50 and 60, thermal fusion between the first electrode 1, the separator 4, and the second electrode 2 may be better achieved such that a stronger bond may be formed among these layers.

In any one or more of the pairs of first and second pressing blocks 50a, 50b, 60a, and 60b, both the length and the width of the respective pressing surfaces may be greater than the corresponding length x and width z of the stack S in which the first electrodes 1, the separator 4, and the second electrodes 2 are stacked.

As shown in FIGS. 1 and 2, the stack S may be configured such that the separator 4 surrounds an outermost surface of the stack. In this manner, inner surfaces of the separator 4 surrounding the stack S may be bonded to corresponding outer surfaces of the first and second electrodes 1 and 2 and outer surfaces of the side sections 4b of the separator 4 facing the inner surfaces of the separator while the first and second electrodes 1 and 2 and the spacer and side sections 4a and 4b of the separator 4 may be bonded to each other via the heating and pressing of the first and second press units 50 and 60. Here, the outermost surface of the stack S surrounded by the separator 4 may include an upper surface, a lower surface, and two opposing side surfaces of the stack. Two side surfaces of the stack S that lie in planes parallel to the stacking direction do not include the electrode tab 1a, 2b. The upper and lower surfaces of the stack S may be perpendicular to these side surfaces.

Accordingly, when the first electrode 1, the portions of the separator 4, and the second electrode 2 are stacked to form the electrode assembly, the use of gripper 51 may effectively prevent or at least inhibit shifting of the first and second electrodes 1 and 2 and the separator 4 during pressing by the press units 50 and 60 and thereby prevent the stack form from breaking up or otherwise disassociating.

In some arrangements, the electrode assembly manufacturing apparatus 100 may further include a third moving unit (not illustrated) attached to and configured for rotating or otherwise moving a third transfer head (not illustrated). The third moving unit and the third transfer head may be the same as or similar to the first and the second moving units 37, 47 and the first and the second transfer heads 32, 42, respectively. In this manner, the third moving unit and the third transfer head may move the stack S after initial pressing by the first press unit 50 to the second press unit 60. In some such arrangements, the third transfer head may be a suction head such that the third transfer head may temporarily hold the stack S via vacuum suction.

In some arrangements, the first press unit 50 compresses the stack S while heating the stack. In this manner, the stack S may achieve at least the minimum adhesive force necessary to withstand transfer of the stack via the third transfer head by vacuum suction while maintaining the integrity of the stack.

In some arrangements, the third moving unit may include a connection part (not illustrated) connecting a rotating shaft to the third transfer head. In such arrangements, when the third transfer head suctions the stack S initially bonded by the press unit 50, the rotating shaft of the third moving unit may rotate to move the stack from the first press unit 50 to the second press unit 60.

Referring now to FIG. 6, an electrode assembly manufacturing process may include a stack manufacturing operation S10 for manufacturing a stack such as stack S, a primary heat pressing operation S20 for initial heating and pressing of the stack, and a secondary heat pressing operation S30 for secondary, e.g., subsequent, heating and pressing of the initially pressed stack.

In the stack manufacturing operation S10, a stack may be manufactured by supplying and stacking a first electrode, e.g., first electrode 1, a separator, e.g., separator 4, and a second electrode, e.g., second electrode 2, to an in-process stack on a stack table, e.g., stack table 10. In this step, the in-process stack is supported by the stack table.

In a step S11 of the stack manufacturing operation a section of the separator is supplied to the stack table. In some arrangements, this section of the separator is mounted to the stack table. in a step S12, the stack table is rotated in a direction towards a first electrode supply unit, e.g., first electrode supply unit 30 In a step S13, the first electrode is supplied and then stacked onto the separator section mounted or otherwise resting on the stack table. In a step S14, the stack table is rotated in a direction of a second electrode supply unit, e.g., Second electrode supply unit 40, such that a further section of the separator folds onto an overlies the first electrode. In a step S15, the second electrode is supplied and then stacked onto a further section of the separator. In a step S16, the operations S12, S13, S14, and S15 are repeated to sequentially add one or more further first electrodes, sections of the separator, and one or more further second electrodes. In repeating the operation S12, a still further section of the separator folds onto and overlies the second electrode via rotation of the stack table before the next first electrode is supplied and then stacked onto that still further section of the separator. Via the alternating rotation of the stack table, the separator may be stacked in a zigzag manner between first and second electrodes.

In addition, in a step S17 of the stack manufacturing operation S10, the outermost portion of the stack may be surrounded by the separator by rotating the separator in one direction. Here, the outermost portion of the stack includes an upper surface, a lower surface, and both opposite side surfaces of the stack. Each of the side surfaces may extend in planes parallel to the stacking direction of the stack. Each of the side surfaces may exclude all surfaces on which an electrode tab, e.g., electrode tabs 1a, 2a, is located. The upper and lower surfaces of the stack each include a surface perpendicular to one or both of the side surfaces of the stack.

In the primary heat press operation S20, adhesive force is imparted throughout the stack. In this operation, either one or both of the upper surface and the lower surface of the stack may be pressed and fixed using a gripper, e.g., gripper 51. At the same time, the upper surface and the lower surface of the stack may be pressed by pressing blocks, e.g., the pair of pressing blocks 50a and 50b, in directions towards each other with the heated first press unit, e.g., the first press unit 50.

In this operation, the upper surface or the lower surface of the stack may be pressed by using the first press unit in a state where the gripper is positioned on a part of the upper or lower surface of the stack.

In some arrangements, in the primary heat press operation S20, the first electrodes, the separator, and the second electrodes of the surface on which the gripper is positioned may not be bonded. In other words, in the primary heat press operation S20, only the surface of the stack on which the gripper is not positioned may be pressed, so that the first electrodes, the separator, and the second electrodes may be bonded. In such arrangements, the first press unit may include a groove having the shape corresponding to the shape of the gripper such that the first press unit may not press the gripper.

In some arrangements, in the primary heat press operation S20, the surface of the stack on which the gripper is located is pressed to bond the first electrodes, the separator, and the second electrodes. In such arrangements, the first press unit may be provided with a planar surface for pressing the stack, and the gripper may include a heat-conducting material. Accordingly, the gripper may receive heat from the heated first press unit to press the stack, and only the first electrodes, the separator, and the second electrodes in the portion where the gripper is positioned in the stack may have adhesive force imparted upon them.

In the primary heat press operation S20, the stack may be pressed while fixed with the gripper for a time in a range of 5 seconds to 20 seconds within an environment having an ambient temperature in a range from 45° C. to 75° C. and with an applied pressure in a range from 1 MPa to 2.5 MPa.

In the secondary heat press operation S30, the adhesive force may be secondarily imparted to the stack after the adhesive force has been initially imparted in the primary heat press operation S20. In the secondary heat press operation S30, a portion or portions of the stack on which adhesive force was not imparted in the primary heat press operation S20 may have such adhesive force imparted on such portion or portions.

In the second heat press operation S30, the stack may be pressed after the primary heat press operation S20, and in this case, the stack may be pressed with the gripper removed from the stack. In the secondary heat press operation S30, the stack may be pressed by using the heated second press unit, e.g., second press unit 60.

In some arrangements, in the secondary heat press operation S30, the second press unit may be provided with a planar surface to surface-press an entire surface of the stack facing the surface of the stack to be pressed.

In some arrangements, in the secondary heat press operation S30, the second press unit may include a hole or a groove having a shape corresponding to the shape of the gripper such that the second press unit presses only the portion of the stack where the gripper had not been located.

In this manner, adhesive force may be imparted throughout the stack, and indeed may be imparted uniformly throughout the stack.

In some arrangements, in the secondary heat press operation S30, the stack from which the gripper is removed and which has been initially heated and pressed may be pressed for a time in a range of 5 seconds to 60 seconds within an environment having an ambient temperature of 50° C. to 90° C. and an ambient pressure in a range from 1 MPa to 6 MPa.

In some such arrangements, the ambient temperature for the secondary heat press operation S30 may be 50° C. or more, and preferably 65° C. or more.

In some arrangements, the ambient temperature for the secondary heat press operation S30 may be 90° C. or less, and preferably 85° C. or less.

In some arrangements, the ambient temperature for the secondary heat press operation S30 may be in a range from 50° C. to 90° C., preferably in a range from 65° C. to 90° C., and more preferably in a range from 65° C. to 85° C. Most preferably, the ambient temperature for the secondary heat press operation may be 70° C.

In some arrangements, the applied pressure for the secondary heat press operation S30 may be 1 MPa or more, preferably 1.5 MPa or more, and more preferably 3 MPa or more.

In some arrangements, the applied pressure for the secondary heat press operation S30 may be 6 MPa or less, and preferably 5.5 MPa or less.

In some arrangements, the applied pressure for the secondary heat press operation S30 may be in a range from 1 MPa to 6 MPa, preferably in a range from 1.5 MPa to 6 MPa, and more preferably in a range from 3 MPa to 5.5 MPa.

In some arrangements, the heating and pressing in the secondary heat press operation S30 may be a time of 5 seconds or more, and preferably 7 seconds or more.

In some arrangements, the heating and pressing in the secondary heat press operation S30 may be a time of 60 seconds or less, preferably 30 seconds or less, and more preferably 25 seconds or less.

In some arrangements, the heating and pressing in the secondary heat press operation S30 may be a time in a range from 5 seconds to 60 seconds, preferably in a range from 5 seconds to 30 seconds, more preferably in a range from 7 seconds to 25 seconds.

In some arrangements, the secondary heat press operation S30 may heat and press the stack in an environment having an ambient temperature in a range from 50° C. to 90° C. and with an applied pressure in a range from 1 MPa to 6 MPa for a time in a range from 5 seconds to 60 seconds, preferably an environment having an ambient temperature in a range from 65° C. or more and 90° C. or less and with an applied pressure of 1.5 MPa to 6 MPa for a time in a range from 5 seconds to 30 seconds. More preferably, the secondary heat press operation may heat and press the stack in an environment having an ambient temperature in a range from 65° C. to 85° C. and with an applied pressure in a range from 3 MPa to 5.5 MPa for a time in a range from 7 seconds to 25 seconds. Here, the case where the environment for the secondary heat press operation S30 has an ambient temperature of 70° C. may be most preferable.

Here, the pressure for the initial heating and pressing and the pressure for the secondary heating and pressing refer to the pressure applied by the pair of pressure blocks, and the ambient temperature means the temperature of heat applied by the body of the stack table or the pair of pressing blocks. In addition, the pair of pressing blocks may be the same or different. That is, after pressing the stack while heating the stack by the pair of pressing blocks in a state in which the stack is gripped with the gripper, with the gripper released, the stack may be pressed while being heated by the same pair of pressing blocks in the state where the grip by the gripper is released.

When the temperature, pressure, and time conditions are not satisfied, the electrodes of the electrode assembly may not be properly adhered, and air permeability of the assembly may become excessively high.

Put another way, when the temperature, pressure, and time conditions are satisfied, the electrode assembly may be manufactured without individually heating or pressing the electrodes constituting the electrode assembly by simultaneously imparting an appropriate level of adhesive force in the assembly and an appropriate level of air permeability between the electrode and the separator constituting the electrode assembly while minimizing damage to the unit electrode.

In some arrangements, the positive electrode may be manufactured by, for example, coating a positive electrode current collector with a positive electrode coating mixture comprising a positive electrode active material, a conductive material, and a binder and then drying the coating mixture. If necessary, a filler may be added to the mixture. Such materials may be any appropriate materials used in the relevant field, in particular those commonly used for the particular application.

For example, the positive electrode active material may include: layered compounds, such as lithium cobalt oxide ($LiCoO_2$) and lithium nickel oxide ($LiNiO_2$), or compounds substituted with one or more transition metals; lithium manganese oxide represented by the chemical formula $Li_{1+x}Mn_{2-x}O_4$ (where x is 0 to 0.33), such as $LiMnO_3$, $LiMn_2O_3$, and $LiMnO_2$; lithium copper oxide ($Li_2CuO_2$); vanadium oxides, such as $LiV_3O_8$, $LiFe_3O_4$, $V_2O_5$, and $Cu_2V_2O_7$; nickel (Ni) site-type lithium nickel oxides represented by the chemical formula $LiNi_{1-x}M_xO_2$ (where M=Co, Mn, Al, Cu, Fe, Mg, B or Ga, and x=0.01 to 0.3); lithium manganese composite oxides represented by the chemical formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which a part of Li in the chemical formula is substituted with an alkaline earth metal ion; disulfide compounds; and $Fe_2(MoO_4)_3$, but the positive electrode active material is not limited to such materials.

The materials that may be used for the positive electrode current collector are not particularly limited. The positive electrode current collector preferably has a relatively high conductivity without causing a chemical change when used in a battery. For example, stainless steel, aluminum, nickel, titanium, calcined carbon, or a material in which a surface of aluminum or stainless steel is treated with carbon, nickel, titanium, silver, and the like may be used. Preferably, the positive electrode current collector may be aluminum. Adhesion between the current collector and the positive electrode coating mixture desirably may be increased by including fine irregularities on a surface of the current collector interfacing with the coating mixture. Moreover, various structural configurations of the positive electrode current collector may be used, such as a film, a sheet, a foil, a net, a porous body, a foam body, and a non-woven body. The positive electrode current collector generally may have a thickness in a range from 3 μm to 500 μm.

The conductive material positive electrode coating mixture generally may be included in an amount from to 50 wt % based on the total weight of the mixture including the positive electrode active material. The conductive material is not particularly limited and preferably is conductive without causing a chemical change when used in a battery. For example, graphite, such as natural graphite and artificial graphite; carbon black, such as carbon black, acetylene black, Ketjen black, channel black, furnace black, lamp black, and summer black; conductive fibers, such as carbon fibers and metal fibers; carbon and metal powders, such as carbon fluoride, aluminum, and nickel powders; conductive whiskeys, such as zinc oxide and potassium titanate; conductive metal oxides, such as titanium oxide; and polyphenylene derivatives may be used for the conducted material.

The binder in the positive electrode coating mixture assists in bonding between the active material and the conductive material and in bonding the coating mixture to the current collector. Such a binder is generally included in an amount from 1 to 50% by weight based on the total weight of the mixture including the positive electrode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluororubber, and various copolymers.

The filler optionally added to the positive electrode coating mixture may be used as a component to suppress the expansion of the positive electrode. Such a filler is not particularly limited and may include a fibrous material that does not cause a chemical change when used in a battery. For example, olefin polymers, such as polyethylene and a polypropylene, and fibrous materials, such as glass fiber and carbon fiber, may be used.

In some arrangements, the negative electrode may be manufactured by coating, drying, and pressing a negative electrode active material on a negative electrode current collector, and if necessary, the conductive materials, binders, fillers, and the like discussed above may be optionally further included. In any event, any appropriate materials commonly used in the relevant field may be used, in particular those commonly used for the particular application. For example, as the negative electrode active material, carbon, such as non-graphitizable carbon and graphitic carbon; metal composite oxides represented by the chemical formulas $LixFe_2O_3$ ($0 \leq x \leq 1$), $Li_xWO_2$ ($0 \leq x \leq 1$), $Sn_x Me_{1-x}Me'yOz$ (Me: Mn, Fe, Pb, Ge; Me': Al, B, P, Si, elements of groups 1, 2 and 3 of the periodic table, and halogens; $0 < x \leq 1$; $1 \leq y \leq 3$; $1 \leq z \leq 8$); lithium metal; lithium alloys; silicon-based alloys; tin-based alloys; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers, such as polyacetylene; and Li—Co—Ni-based materials may be used.

The materials that may be used for the negative electrode current collector are not particularly limited. The negative electrode current collector preferably has a relatively high conductivity without causing a chemical change when used in the battery. For example, copper; stainless steel; aluminum; nickel; titanium; calcined carbon; a material in which the surface of copper or stainless steel is surface-treated with carbon, nickel, titanium, silver, and the like; and an aluminum-cadmium alloy may be used. In addition, like the positive electrode current collector, the bond between the negative electrode current collector and the negative electrode active material may be strengthened by forming fine irregularities on the surface of the negative electrode current collector. Various structural configurations of the negative electrode current collector may also be used such as a film, a sheet, a foil, a net, a porous body, a foam body, a non-woven body, and the like. In addition, the negative electrode current collector may have a thickness generally in a range of 3 μm to 500 μm.

In some arrangements, the separator may be an organic/inorganic complex porous SRS (Safety-Reinforcing Separator). The SRS may have a structure in which a coating layer component including inorganic particles and a binder polymer is coated on a polyolefin-based separator substrate.

Since the SRS does not undergo high-temperature thermal contraction due to the heat resistance of the component inorganic particles, even if the electrode assembly is penetrated by a needle-shaped conductor, an elongated length of the safety separator can be maintained.

The SRS may have a uniform porous structure formed by an interstitial volume between the inorganic particles that are components of the coating layer, in addition to the porous structure of the separator substrate itself. The pores may not only significantly alleviate any external impacts applied to the electrode assembly but may also facilitate the movement of lithium ions through the pores, as well as enable a large amount of electrolyte to be impregnated into the separator, thereby promoting improved performance of the battery.

In some arrangements, the separator may be dimensioned in its width dimension (orthogonal to the longitudinal dimension in which the separator is unrolled) such that separator portions extend outwardly on both sides beyond corresponding edges of adjacent positive and negative electrodes (hereinafter "surplus portions" of the separator). Moreover, such outwardly extending portions of the separator may have a structure including a coating layer thicker than the thickness of the separator formed on one or both sides of the separator in order to prevent shrinkage of the separator. For more information regarding the thicker coating layer on the outwardly extending surplus portions of the separator, see Korean Patent Application Publication No. 10-2016-0054219, the entire contents of which are incorporated herein by reference. In some arrangements, each separator surplus portion may have a size of 5% to 12% of the width of the separator. Moreover, in some arrangements, the coating layer may be coated on both surfaces of the separator over a width of 50% to 90% of the width of each separator surplus portion. In addition, the widths of the coating layers may be the same or different on each surface of the separator.

In some arrangements, the coating layer may include inorganic particles and a binder polymer as components.

In some arrangements, examples of the polyolefin-based separator component may include high-density polyethylene, linear low-density polyethylene, low-density polyethylene, ultra-high molecular weight polyethylene, polypropylene, or derivatives thereof.

In some arrangements, the thickness of the coating layer may be smaller than the thickness of the first electrode or the second electrode. In some such arrangements, the thickness of the coating layer may be 30% to 99% of the thickness of the first electrode or the second electrode.

In some arrangements, the coating layer may be formed by wet coating or dry coating.

In some arrangements, the polyolefin-based separator substrate and the coating layer may exist in a form in which pores on the surface of the substrate and the coating layer are anchored with each other, whereby the separator substrate and the coating layer may be bonded together firmly. In this case, the substrate and the coating layer of the separator may have a thickness ratio from 9:1 to 1:9. A preferred thickness ratio may be 5:5.

In some arrangements, the inorganic particles may be inorganic particles commonly used in the art. The inorganic particles may interact with each other to form micropores in the form of empty spaces between the inorganic particles while structurally helping to maintain the physical shape of the coating layer. In addition, since the inorganic particles generally have properties that do not change their physical properties even at high temperatures of 200° C. or more, the resultant organic/inorganic complex porous film generally and desirably has excellent heat resistance.

In addition, the materials that may be used for the inorganic particles are not particularly limited but are preferably electrochemically stable. That is, the inorganic particles are preferably selected such that oxidation and/or reduction reactions do not occur in the operating voltage range of the applied battery (for example, 0 to 5 V based on Li/Li+). In particular, the use of inorganic particles having ion transport ability may improve performance by increasing the ionic conductivity in the electrochemical device. Thus, use of inorganic particles having ionic conductivity as high as possible is preferable. In addition, when the inorganic particles have a high density, it is difficult to disperse the inorganic particles during coating, and it can also undesirably increase the weight of the battery. Therefore, use of inorganic particles having density as low as possible is preferable. In addition, inorganic materials having a high dielectric constant contribute to an increase in the degree of dissociation of electrolyte salt, such as a lithium salt, in a liquid electrolyte, thereby improving the ionic conductivity of the electrolyte.

For the above reasons, the inorganic particles may be at least one type selected from the group consisting of inorganic particles having piezoelectricity and inorganic particles having lithium-ion transport ability.

Inorganic particles having piezoelectricity refer to materials which are a nonconductor at normal pressure but have a property of conducting electricity due to a change in the internal structure when a certain pressure is applied. They are also materials which exhibit high permittivity characteristics with a permittivity constant of 100 or more. Inorganic particles having piezoelectricity also generate an electric potential difference between opposing surfaces, e.g., of a separator, by causing one surface to be positively charged and the other surface to be negatively charged, or vice versa, when either tension or compression is applied to an object composed of the inorganic particles, e.g., a separator.

When the inorganic particles having the above characteristics are used as a coating layer component, in the case of an internal short circuit of both electrodes due to an external impact, such as by a needle-shaped conductor, the positive electrode and the negative electrode may not directly contact one another due to the inorganic particles coated on the separator. Moreover, due to the piezoelectricity of the inorganic particles, an electric potential difference may occur within the particles, which desirably may result in electron movement between both electrodes (i.e., the flow of a minute current), so that it may be possible to gently reduce the voltage of the battery, thereby improving safety.

Examples of materials for the inorganic particles having piezoelectricity may be one or more selected from the group consisting of $BaTiO_3$, $Pb(Zr,Ti)O_3$ (PZT), those represented by the chemical formula $Pb_{1-x}La_xZr_{1-y}Ti_yO_3$ (PLZT), $PB(Mg_3Nb_{2/3})O_3$—$PbTiO_3$ (PMN-PT), and hafnia ($HfO_2$), but are not limited to these materials.

Inorganic particles having lithium-ion transport ability refer to inorganic particles containing a lithium element but not storing lithium and instead having a function of moving lithium ions. The inorganic particles having lithium-ion transport ability are capable of transporting and moving lithium ions due to a kind of defect in the particle structure. As a result, the lithium-ion conductivity in the battery may be improved, thereby improving battery performance.

Examples of materials for the inorganic particles having lithium-ion transport ability may be one or more selected from the group consisting of lithium phosphate ($Li_3PO_4$), lithium titanium phosphate (represented by the chemical formula $Li_xTi_y(PO_4)_3$, where $0<x<2$, $0<y<3$), lithium aluminum titanium phosphate (represented by the chemical formula $Li_xAl_yTi_z(PO_4)_3$, where $0<x<2$, $0<y<1$, $0<z<3$), glass of the series represented by the chemical formula $(LiAlTiP)_xO_y$, $(0<x<4$, $0<y<13)$, lithium lanthanum titanate (represented by the chemical formula $Li_xLa_yTiO_3$, where $0<x<2$, $0<y<3$), lithium germanium thiophosphate (represented by the chemical formula $Li_xGe_yP_zS_w$, where $0<x<4$, $0<y<1$, $0<z<1$, $0<w<5$), lithium nitride (represented by the chemical formula $Li_xN_y$, where $0<x<4$, $0<y<2$), glass of the $SiS_2$ series (represented by the chemical formula $Li_xSi_yS_z$, where $0<x<3$, $0<y<2$, $0<z<4$), and glass of the $P_2S_5$ series (represented by the chemical formula $Li_xP_yS_z$, where $0<x<3$, $0<y<3$, $0<z<7$), but are not limited to these materials.

The composition ratio of the inorganic particles and the binder polymer, which are components of the coating layer of the separator, is not particularly limited, but may be adjusted within the range of 10:90 to 99:1 by weight %, and preferably within the range of 80:20 to 99:1 by weight %. When the composition ratio is less than 10:90 by weight %, the content of the polymer may become excessively large, and the pore size and porosity may be reduced due to a decrease in the empty space formed between the inorganic particles, finally resulting in deterioration of the battery performance. On the other hand, when the composition ratio exceeds 99:1 by weight %, the content of the polymer may be too small and the mechanical properties of the final organic/inorganic composite porous separator may become deteriorated due to weakened adhesive force between the inorganic materials.

In some arrangements, as the binder polymer, a binder polymer commonly used in the art may be used as the binder polymer.

The coating layer of the organic/inorganic composite porous separator may further include other commonly known additives in addition to the aforementioned inorganic particles and binder polymer.

In some arrangements, the coating layer may be referred to as an active layer.

Although the present invention has been described in detail through exemplary arrangements, the apparatus for manufacturing the electrode assembly according to the present invention is not limited to these arrangements. Various implementations are possible by those of ordinary skill in the art within the technical spirit of the present invention.

In addition, the description of the apparatus for manufacturing the electrode assembly according to the present disclosure and the configuration of the apparatus is applicable to the method of manufacturing the electrode assembly according to the present disclosure and the electrode assembly manufactured by the method of manufacturing the electrode assembly is one that may be manufactured by the apparatus for manufacturing the electrode assembly according to the present disclosure.

1) Example 1

19 positive electrodes, 20 negative electrode sheets, and separators were respectively supplied to the stack table from the positive electrode supply unit, the negative electrode supply unit, and the separator supply unit.

More specifically, the positive electrodes and the negative electrodes were supplied in the form of being cut from a positive electrode sheet and a negative electrode sheet, respectively, and the separator was supplied in the form of a separator sheet. Thereafter, the supplied separator was folded while rotating the stack table, and the positive electrode, the negative electrode, and the separator were stacked. In this case, the stacking was carried out while pressing and fixing the upper surface of the positive electrode or the negative electrode stacked on the uppermost side of the stack table with a gripper, and as a result, a stack using 39 electrodes were manufactured by stacking the positive electrode, the negative electrode, and the separator on the stack table in the form in which the positive electrode and the negative electrode were alternately disposed between folded sections of the separator.

After manufacturing the stack, the stack was gripped with the gripper and pressed for 15 seconds while heating the stack in an environment having an ambient temperature of 70° C. and with an applied pressure of 1.91 MPa (i.e., during a primary heat press operation).

After the primary heat press operation, as represented in Table 1 below, a secondary heat press operation in which the stack table was heated to a temperature of 70° C. (temperature condition) and a pressure of 2.71 MPa (pressure condition) was applied to the stack with a pressing block of the press for 10 seconds (press time) was performed to manufacture an electrode assembly of Example 1.

In the process of manufacturing the electrode assembly, the above-described contents of the present disclosure may be applied.

2) Examples 2 to 12

Electrode assemblies of Examples 2 to 12 were manufactured in the same manner as in Example 1, except that the secondary heat press operation was performed under the temperature conditions, pressure conditions, and press time represented in Table 1 below. That is, the primary heat press conditions of Examples 1 to 12 are the same.

TABLE 1

| | Primary heat press | | | |
| --- | --- | --- | --- | --- |
| | Temperature condition | Pressure condition Press area (314.57 cm²) | | Press time |
| | (° C.) | Tonf | MPa | (s) |
| Example 1 | 70 | 6 | 1.91 | 15 |
| Example 2 | | | | |
| Example 3 | | | | |
| Example 4 | | | | |
| Example 5 | | | | |
| Example 6 | | | | |
| Example 7 | | | | |
| Example 8 | | | | |
| Example 9 | | | | |
| Example 10 | | | | |
| Example 11 | | | | |
| Example 12 | | | | |

TABLE 1-continued

| | Secondary heat press | | | |
|---|---|---|---|---|
| | Temperature condition | Pressure condition Press area (554.1 cm$^2$) | | Press time |
| | (° C.) | Tonf | MPa | (s) |
| Example 1 | 70 | 5 | 2.71 | 10 |
| Example 2 | 70 | 5 | 2.71 | 20 |
| Example 3 | 70 | 4 | 2.17 | 10 |
| Example 4 | 70 | 4 | 2.17 | 20 |
| Example 5 | 60 | 4 | 2.17 | 10 |
| Example 6 | 60 | 4 | 2.17 | 20 |
| Example 7 | 60 | 5 | 2.71 | 10 |
| Example 8 | 60 | 5 | 2.71 | 20 |
| Example 9 | 80 | 4 | 2.17 | 10 |
| Example 10 | 80 | 4 | 2.17 | 20 |
| Example 11 | 80 | 5 | 2.71 | 10 |
| Example 12 | 80 | 5 | 2.71 | 20 |

3) Comparative Examples 1 to 5

Electrode assemblies of Comparative Examples 1 to 5 were manufactured in the same manner as in Example 1, except that the primary heat press operation was performed under the temperature conditions, pressure conditions, and press time represented in Table 2 below, and the secondary heat press operation was not performed.

TABLE 2

| | Primary heat press | | | |
|---|---|---|---|---|
| | Temperature condition | Pressure condition Press area (314.57 cm$^2$) | | Press time |
| | (° C.) | Tonf | MPa | (s) |
| Comparative Example 1 | 70 | 6 | 1.91 | 8 |
| Comparative Example 2 | 80 | 6 | 1.91 | 8 |
| Comparative Example 3 | 90 | 4 | 1.27 | 8 |
| Comparative Example 4 | 90 | 4 | 1.27 | 15 |
| Comparative Example 5 | 90 | 6 | 1.91 | 8 |
| Comparative Example 6 | 90 | 8 | 2.54 | 8 |
| Comparative Example 7 | 90 | 8 | 2.54 | 15 |

| | Secondary heat press (not performed) | | | |
|---|---|---|---|---|
| | Temperature condition | Pressure condition Press area (554.1 cm$^2$) | | Press time |
| | (° C.) | Tonf | MPa | (s) |
| Comparative Example 1 | — | — | — | — |
| Comparative Example 2 | — | — | — | — |
| Comparative Example 3 | — | — | — | — |
| Comparative Example 4 | — | — | — | — |
| Comparative Example 5 | — | — | — | — |
| Comparative Example 6 | | | | |
| Comparative Example 7 | | | | |

As a result of vacuum suction for the electrode assemblies of Examples 1 to 12 and Comparative Examples 1 to 5 manufactured under the conditions of Tables 1 and 2 for 60 seconds under the same condition as the condition of the electrode supply unit according to the present disclosure, in all the electrode assemblies of Comparative Examples 1 to 5, it was observed that the electrode and the separator were separated before 60 seconds.

This result means that the electrode assemblies of Comparative Examples 1 to 5 have poor adhesion between the electrode and the separator, and the electrode assembly according to the present disclosure, which has been subjected to the primary and the secondary presses, has a good adhesion state, and thus has an excellent effect of preventing the electrode assembly from being unfolded or otherwise disassociated.

In the case of Comparative Examples 6 and 7, although the separation of the electrode and the separator was not observed before 60 seconds, the vacuum suction was performed under a pressure condition of 2.54 MPa thereby confirming that damage to the electrode assembly occurred.

3) Experimental Example 1—Evaluation of Adhesive Force

Adhesive force of the upper surface, the lower surface, and the middle surface were measured disassembling and analyzing the electrode assemblies of Examples 1 to 12 and Comparative Examples 6 and 7 in which the separation of the electrode and the separator was not observed before 60 seconds as the result of the vacuum suction. Specifically, adhesive force (negative electrode adhesive force) between the negative electrode and the separator located at the lowermost end based on the stacking direction of the electrode assembly was measured, and the measured adhesive force was determined as lower surface adhesive force, and adhesive force (positive electrode adhesive force) between the negative electrode and the separator located at the uppermost end based on the stacking direction of the electrode assembly was measured, and the measured adhesive force was determined as upper surface adhesive force. Adhesive force (negative electrode adhesive force) between the negative electrode and the separator located at the middle location between the upper end and the lower end of the electrode assembly was measured, and the measured adhesive force was determined as middle adhesive force.

More specifically, portions corresponding to the upper end, the lower end, and the middle locations between the upper end and the lower end of the electrode assembly were separated along the stacking direction of the electrode assembly.

In each of the separated electrode assemblies, the negative electrode and the separator having a width of 55 mm and a length of 20 mm in the width direction were sampled.

The sampled sample was adhered to the slide glass so that the electrode was positioned on the adhesive surface of the slide glass.

After that, the slide glass to which the sample was attached was mounted on the adhesive force measuring device, and the value when the separator was peeled off from the electrode was measured by pulling the separator in a direction orthogonal to the plane on which the slide glass was mounted.

The results were represented in Table 3 below.

TABLE 3

| | Negative electrode adhesive force (gf/20 mm) | | | |
| | Upper surface | Middle | Lower surface | Deviation |
| --- | --- | --- | --- | --- |
| Example 1 | 19.8 | 10.8 | 21.5 | 10.7 |
| Example 2 | 20.3 | 9.7 | 19.5 | 10.6 |
| Example 3 | 9.9 | 5.2 | 11.4 | 6.2 |
| Example 4 | 16.6 | 9.2 | 17 | 7.8 |
| Example 5 | 9.4 | 4.0 | 9.9 | 5.9 |
| Example 6 | 11.1 | 7.1 | 14.3 | 7.2 |
| Example 7 | 7.9 | 6.2 | 10.5 | 4.3 |
| Example 8 | 13.4 | 8.9 | 18 | 9.1 |
| Example 9 | 14 | 5.2 | 10.4 | 8.8 |
| Example 10 | 14.2 | 7.9 | 14.6 | 6.7 |
| Example 11 | 16.7 | 7.2 | 18.5 | 11.3 |
| Example 12 | 25.3 | 12.0 | 22.4 | 13.3 |
| Comparative Example 6 | 15.6 | 7.2 | 25.9 | 18.7 |
| Comparative Example 7 | 30.7 | 12.6 | 25.1 | 18.1 |

Referring to the result of Table 3, in the case of Comparative Examples 6 and 7, as described above, the vacuum suction was carried out under the pressure condition of 2.54 MPa, thereby confirming that damage may occur to the electrode assembly, and the deviation of the adhesive force was significantly greater than 15 gf/20 mm. This means that the performance of the electrode assembly may not be uniform depending on the location.

On the other hand, in the case of Examples 1 to 12, it was confirmed that the deviation of the adhesive force was less than 15 gf/20 mm, which was not significant. That is, it was confirmed that the electrode assemblies of Examples 1 to 12 had uniform performances.

3) Experimental Example 2—Evaluation of Air Permeability

Among Examples 1 to 12, the air permeability of the electrode assemblies of Examples 1, 6, and 12, which differed only in the temperature condition of the secondary press, was evaluated.

Specifically, after collecting the separators in the electrode assemblies of Examples 1, 6, and 12, the separators were cut to prepare separator samples having a size of 5 cm×5 cm (width×length). After that, the separator samples were washed with acetone.

Then, air permeability of Examples 1, 6, and 12 were measured by measuring the time it takes for 100 ml (or 100 cc) of air to pass through the separator of 1 square inch at room temperature and under the pressure condition of 0.05 MPa by using a Gurley type Densometer (No. 158) from Toyoseiki in accordance with the JIS Gurley measurement method of the Japanese industrial standard.

The results are represented in Table 4.

TABLE 4

| | Air permeability (sec/100 ml) | | | |
| | Upper surface | Middle | Lower surface | Deviation |
| --- | --- | --- | --- | --- |
| Example 1 | 88 | 76 | 84 | 11.1 |
| Example 6 | 88 | 75 | 87 | 12.3 |
| Example 12 | 101 | 84 | 100 | 17.4 |

From the results of Table 4, when the condition of the secondary heat press according to the present disclosure is satisfied, it was confirmed that the air permeability corresponding to each location was less than 120 sec/100 ml and had an appropriate level of air permeability for use as an electrode assembly. It was further confirmed that the deviation of the air permeability according to each location was also less than 20 sec/100 ml, and had a level of air permeability deviation that could be determined to be uniform. That is, it was confirmed once again that the electrode assembly manufactured by the manufacturing method according to the present invention had uniform performance.

Among them, it was confirmed that the air permeability deviation was the smallest in the case of Example 1 with the temperature condition of 70° C.

Through the above experimental examples, it was confirmed that the electrode assembly according to the present invention had proper and uniform air permeability and adhesive force.

In the forgoing, the present invention has been described with reference to exemplary embodiments, but those skilled in the art may appreciate that the present invention may be variously modified without departing from the spirit and the scope of the present invention as set forth in the appended claims.

The invention claimed is:

1. An electrode assembly manufacturing apparatus for fabricating a stack comprising a first electrode, a second electrode, and a second electrode section of a separator between the first and the second electrodes, comprising:

a stack table configured for supporting the stack;

a gripper configured for fixing the stack; and a first press unit configured for heating and compressing the stack fixed by the gripper, the first press unit including a pair of pressing blocks configured for compressing opposing surfaces of the stack, each of the pair of pressing blocks of the first press unit including a gripper groove having a shape corresponding to a shape of the gripper, the gripper groove having a depth greater than a height of the gripper, so that the first press unit is configured to press only a surface of the stack on which the gripper is not positioned.

2. The electrode assembly manufacturing apparatus of claim 1, wherein the pair of pressing blocks are moveable in directions towards each other and configured for compressing either one or both of the stack and the gripper.

3. The electrode assembly manufacturing apparatus of claim 2, wherein the gripper is in a form of a column or plate extending in a direction parallel to either one or both of an upper plane defined by an upper surface of the stack and a lower plane defined by a lower surface of the stack, and wherein the gripper presses a portion of each of the upper surface and the lower surface of the stack to fix the stack.

4. The electrode assembly manufacturing apparatus claim 3, further comprising:

a second press unit configured for heating and compressing the stack, wherein the pair of pressing blocks of the second press unit have a flat pressing surface that is in contact with the stack and presses the stack.

5. The electrode assembly manufacturing apparatus of claim 2, further comprising:

a second press unit configured for heating and pressing the stack, wherein the gripper is in a form of a column or plate extending in a direction parallel to either one or both of an upper plane defined by an upper surface of the stack and a lower plane defined by a lower surface of the stack, wherein the gripper fixes a portion of each of the upper surface and the lower surface of the stack, wherein each one of the pair of pressing blocks of the first press unit have a flat pressing surface that is in contact with the stack and compresses the stack, and wherein at least one of the pair of pressing blocks of the second press unit includes at least one second pressing block groove configured to overlie a corresponding compressed portion of the stack.

6. The electrode assembly manufacturing apparatus of claim 2, wherein the gripper is in a form of a column or plate extending in a direction parallel to either one or both of an upper plane defined by an upper surface of the stack and a lower plane defined by a lower surface of the stack, wherein the gripper presses a portion of each of the upper surface and the lower surface of the stack to fix the stack, and wherein at least one of the pair of pressing blocks of the first press unit presses the gripper such that the gripper presses the stack.

7. The electrode assembly manufacturing apparatus of claim 2, wherein the first press unit includes a press heater configured for heating the pair of pressing blocks.

8. The electrode assembly manufacturing apparatus of claim 2, wherein a length and a width of the pressing surfaces of the pair of pressing blocks are greater than a corresponding length of the stack and a corresponding width of the stack.

9. The electrode assembly manufacturing apparatus of claim 1, further comprising:

a separator supply unit configured for supplying the separator to the stack table;

a first electrode supply unit configured for stacking the first electrode on a first electrode section of the separator supported by the stack table and comprising:

a first electrode seating table configured for seating the first electrode before the first electrode is stacked on the separator; and a first transfer head configured for temporary fixation of the first electrode and for transferring the first electrode from the first electrode seating table to the first electrode section of the separator supported by the stack table while the first electrode is temporarily fixed to the first transfer head; and a second electrode supply unit configured for stacking the second electrode on the second electrode section of the separator when the second electrode section is supported by the stack table, and comprising:

a second electrode seating table configured for seating the second electrode before the second electrode is stacked on the separator; and a second transfer head configured for temporary fixation of the second electrode and for transferring the second electrode from the second electrode seating table to the second electrode section of the separator supported by the stack table while the second electrode is temporarily fixed to the second transfer head.

10. The electrode assembly manufacturing apparatus of claim 8, further comprising:

a rotating unit configured for rotating the stack table, wherein the first electrode supply unit is provided on a first side of the rotating unit, and the second electrode supply unit is provided on a second side of the rotating unit opposite the first side, and wherein the rotating unit rotates the stack table to the first side to face the first transfer head when the first electrode is stacked and rotates the stack table to the second side to face the second transfer head when the second electrode is stacked.

11. The electrode assembly manufacturing apparatus of claim 10, wherein the rotating unit is configured for alternately rotating the stack table in a direction of the first electrode supply unit and a direction of the second electrode supply unit.

12. The electrode assembly manufacturing apparatus of claim 1, wherein the first press unit presses the stack for a time in a range from 5 seconds to 20 seconds within an environment having an ambient temperature in a range from 45° C. to 75° C. and with an applied pressure in a range from 1 MPa to 2.5 MPa.

13. The electrode assembly manufacturing apparatus of claim 1, further comprising:

a second press unit configured for heating and compressing the stack, wherein the second press unit presses the stack pressed by the first press unit for a time in a range from 5 seconds to 60 seconds within an environment having an ambient temperature in a range from 50° C. to 90° C. and with an applied pressure in a range from 1 MPa to 6 MPa.

14. An electrode assembly manufacturing apparatus for fabricating a stack comprising a first electrode, a second electrode, a first electrode section of a separator underlying the first electrode, and a second electrode section of the separator between the first and the second electrodes, comprising:

a stack table configured for supporting the stack;

a separator supply unit configured for supplying the separator to the stack table;

a first electrode supply unit configured for stacking the first electrode on a first electrode section of the separator supported by the stack table;

a second electrode supply unit configured for stacking the second electrode on a second electrode section of the separator when the second electrode is supported by the stack table;

a gripper configured for fixing the stack;

a first press unit configured for heating and compressing the stack fixed by the gripper, the first press unit including a pair of pressing blocks configured for compressing opposing surfaces of the stack, each of the pair of pressing blocks of the first press unit including a gripper groove having a shape corresponding to a shape of the gripper, the gripper groove having a depth greater than a height of the gripper, so that the first press unit is configured to press only a surface of the stack on which the gripper is not positioned; and a second press unit configured for heating and compress-
ing the stack.

* * * * *